United States Patent
Ranganath et al.

(10) Patent No.: US 12,249,028 B2
(45) Date of Patent: Mar. 11, 2025

(54) LIDAR SCENE GENERATION FOR TRAINING MACHINE LEARNING MODELS

(71) Applicant: VELODYNE LIDAR USA, INC., San Jose, CA (US)

(72) Inventors: Deepak Guntur Ranganath, San Jose, CA (US); Vishal Jain, Walnut Creek, CA (US)

(73) Assignee: Velodyne Lidar USA, Inc., San Jose, CA (US)

( * ) Notice: Subject to any disclaimer, the term of this patent is extended or adjusted under 35 U.S.C. 154(b) by 129 days.

(21) Appl. No.: 18/070,213

(22) Filed: Nov. 28, 2022

(65) Prior Publication Data

US 2024/0177412 A1 May 30, 2024

(51) Int. Cl.
| | |
|---|---|
| *G06T 17/00* | (2006.01) |
| *B60W 60/00* | (2020.01) |
| *G01S 17/89* | (2020.01) |
| *G06N 3/00* | (2023.01) |
| *G06T 15/50* | (2011.01) |

(Continued)

(52) U.S. Cl.
CPC ............ *G06T 17/00* (2013.01); *G01S 17/89* (2013.01); *G06V 10/26* (2022.01); *G06V 10/774* (2022.01); *G06V 20/58* (2022.01); *B60W 60/00* (2020.02); *B60W 2420/408* (2024.01); *G06T 2210/56* (2013.01)

(58) Field of Classification Search
CPC . G06T 17/00; G06T 2210/21; G06T 2210/56; G06T 15/003–08; G06T 15/50; G06T 2215/12; G06T 2215/16; G06T 2207/10028; G06T 2207/20081; G06T 19/00–006; G06T 19/20; G06V 10/26; G06V 10/774; G06V 10/75; G06V 20/58; G06V 30/10; B60W 60/00; B60W 2420/408; G01S 17/89; G06N 3/00; G06N 5/00

See application file for complete search history.

(56) References Cited

U.S. PATENT DOCUMENTS

| | | | |
|---|---|---|---|
| 2020/0074230 A1* | 3/2020 | England | G06V 10/774 |
| 2020/0202208 A1* | 6/2020 | Li | G06N 20/00 |

(Continued)

OTHER PUBLICATIONS

EP23211330.8, "Partial European Search Report", Apr. 15, 2024, 15 pages.

(Continued)

*Primary Examiner* — Wesner Sajous
(74) *Attorney, Agent, or Firm* — Kilpatrick Townsend & Stockton LLP

(57) ABSTRACT

A lidar method and system for training and using a machine learning model are disclosed. An example method includes: obtaining a map of a background scene, the map including three-dimensional (3D) point cloud data; obtaining at least one point cloud representation of at least one foreground object, the at least one point cloud representation including 3D point cloud data, wherein one or more lidar sensors were used to generate the 3D point cloud data for the map and the at least one point cloud representation; generating a lidar scene by placing the at least one point cloud representation within the map; and training the machine learning model using the generated lidar scene. The model can be used to identify objects and control a vehicle.

16 Claims, 22 Drawing Sheets

(51) Int. Cl.
   *G06T 19/00*      (2011.01)
   *G06V 10/26*      (2022.01)
   *G06V 10/77*      (2022.01)
   *G06V 10/774*     (2022.01)
   *G06V 20/58*      (2022.01)

(56) References Cited

U.S. PATENT DOCUMENTS

2021/0316669 A1   10/2021  Wang
2021/0383616 A1*  12/2021  Rong ........................ G06N 3/08
2022/0043449 A1    2/2022  Iandola et al.
2022/0165043 A1*   5/2022  Rong ........................ G06N 3/08

OTHER PUBLICATIONS

Cleanerwatt, "Cleanerwatt—How Tesla is using LiDAR to render it Obsolete," Feb. 25, 2022, retrieved from YouTube.com on Nov. 29, 2022, and available at https://www.youtube.com/watch?v=N0GBnCRAPOs&t=36s, 1 page.
Application No. EP23211330.8, Extended European Search Report, Mailed On Aug. 14, 2024, 8 pages.

* cited by examiner

LIDAR SCENE GENERATION FOR TRAINING MACHINE LEARNING MODELS

FIELD OF TECHNOLOGY

The present disclosure relates generally to lidar technology and, in more specific examples, to generating scenes from lidar sensor data for use in training machine learning models.

BACKGROUND

Lidar (light detection and ranging) systems measure the attributes of their surrounding environments (e.g., shape of a target, contour of a target, distance to a target, etc.) by illuminating the environment with light (e.g., laser light) and measuring the reflected light with sensors. Differences in laser return times and/or wavelengths can then be used to make digital, three-dimensional ("3D") representations of a surrounding environment. Lidar technology may be used in various applications including autonomous vehicles, advanced driver assistance systems, mapping, security, surveying, robotics, geology and soil science, agriculture, unmanned aerial vehicles, airborne obstacle detection (e.g., obstacle detection systems for aircraft), etc. Depending on the application and associated field of view, multiple optical transmitters and/or optical receivers may be used to produce images in a desired resolution. A lidar system with greater numbers of transmitters and/or receivers can generally generate larger numbers of pixels.

In a multi-channel lidar device, optical transmitters can be paired with optical receivers to form multiple "channels." In operation, each channel's transmitter can emit an optical signal (e.g., laser light) into the device's environment, and the channel's receiver can detect the portion of the signal that is reflected back to the channel's receiver by the surrounding environment. In this way, each channel can provide "point" measurements of the environment, which can be aggregated with the point measurements provided by the other channel(s) to form a "point cloud" of measurements of the environment.

The measurements collected by a lidar channel may be used to determine the distance ("range") from the device to the surface in the environment that reflected the channel's transmitted optical signal back to the channel's receiver. In some cases, the range to a surface may be determined based on the time of flight of the channel's signal (e.g., the time elapsed from the transmitter's emission of the optical signal to the receiver's reception of the return signal reflected by the surface). In other cases, the range may be determined based on the wavelength (or frequency) of the return signal(s) reflected by the surface.

In some cases, lidar measurements may be used to determine the reflectance of the surface that reflects an optical signal. The reflectance of a surface may be determined based on the intensity of the return signal, which generally depends not only on the reflectance of the surface but also on the range to the surface, the emitted signal's glancing angle with respect to the surface, the power level of the channel's transmitter, the alignment of the channel's transmitter and receiver, and other factors.

Machine learning (ML) algorithms (alternatively referred to herein as "ML models") have become key technologies employed in perception applications. For example, many companies have used ML in big data processing and visualization for establishing data-driven analysis of autonomous transportation. ML algorithms are being deployed for the perception and understanding of the world around vehicles, which includes detecting and classifying objects based on a lidar system. To make classification and prediction, ML first requires training datasets to be fed into ML models so that the ML models are capable of learning and creating pattern recognition and then making their own decisions. The accuracy of ML algorithms depends at least on how well the ML models are trained using the training datasets, and thus the selection of the training datasets (e.g., in volumes, types, etc.) is vital. Typically, ML algorithms become more precise and predictive when the ML models are supplied and trained with more training datasets, more varied inputs on key parameters of the datasets, and/or datasets that are more representative of a true distribution in real life (e.g., real world datasets).

ML algorithms have shown high accuracy and wide adaptability across different fields and scenarios. However, providing thousands of instances of training data to an ML model as required by efficient ML algorithms is still very expensive and time-consuming, and hence the volume of available training data is often insufficient. Acquiring an appropriate training dataset (e.g., real world dataset) for lidar-based machine learning algorithms is more difficult because (1) it is hard to develop and streamline the tooling for annotation in ML learning due to the 3D nature of lidar data, and (2) human cognitive ability to recognize objects in a lidar point cloud is poor as compared to the object recognition associated with images. Because of these difficulties, the training datasets currently used in lidar systems often result in wrongly classified objects or false-positive results when detecting and recognizing objects in a lidar point cloud.

The foregoing examples of the related art and limitations therewith are intended to be illustrative and not exclusive, and are not admitted to be "prior art." Other limitations of the related art will become apparent to those of skill in the art upon a reading of the specification and a study of the drawings.

SUMMARY

The subject matter of this disclosure relates to systems and methods for generating lidar scenes for use in training machine learning models. In one aspect, the subject matter of this disclosure relates to a method of training a machine learning model. The method includes obtaining a map of a background scene, the map including three-dimensional (3D) point cloud data. The method includes obtaining at least one point cloud representation of at least one foreground object, the at least one point cloud representation including 3D point cloud data. One or more lidar sensors were used to generate the 3D point cloud data for the map and the at least one point cloud representation. The method includes generating a lidar scene by placing the at least one point cloud representation within the map. The method further includes training the machine learning model using the generated lidar scene.

In another aspect, the subject matter of this disclosure relates to a system for training a machine learning model. The system includes: one or more computer processors programmed to perform operations including: obtaining a map of a background scene, the map including three-dimensional (3D) point cloud data; obtaining at least one point cloud representation of at least one foreground object, the at least one point cloud representation including 3D point cloud data, wherein one or more lidar sensors were used to generate the 3D point cloud data for the map and the at least one point cloud representation; generating a lidar scene by placing the at least one point cloud representation within the map; and training the machine learning model using the generated lidar scene.

In another aspect, the subject matter of this disclosure relates to a method of controlling a vehicle. The method includes collecting data using a lidar sensor on the vehicle while the vehicle is being operated. The method includes providing the data to a machine learning model, wherein the machine learning model has been trained using a generated lidar scene, and the generated lidar scene includes a lidar point cloud representation of at least one foreground object placed within a map of a background scene including lidar point cloud data. The method includes receiving from the machine learning model an identification of an object in a vicinity of the vehicle. The method further includes controlling the vehicle based on the identification of the object in the vicinity of the vehicle.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of any of the present inventions. As can be appreciated from the foregoing and following description, each and every feature described herein, and each and every combination of two or more such features, is included within the scope of the present disclosure provided that the features included in such a combination are not mutually inconsistent. In addition, any feature or combination of features may be specifically excluded from any embodiment of any of the present inventions.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the general description given above and the detailed description of the preferred embodiments given below serve to explain and teach the principles described herein.

Figure 1:
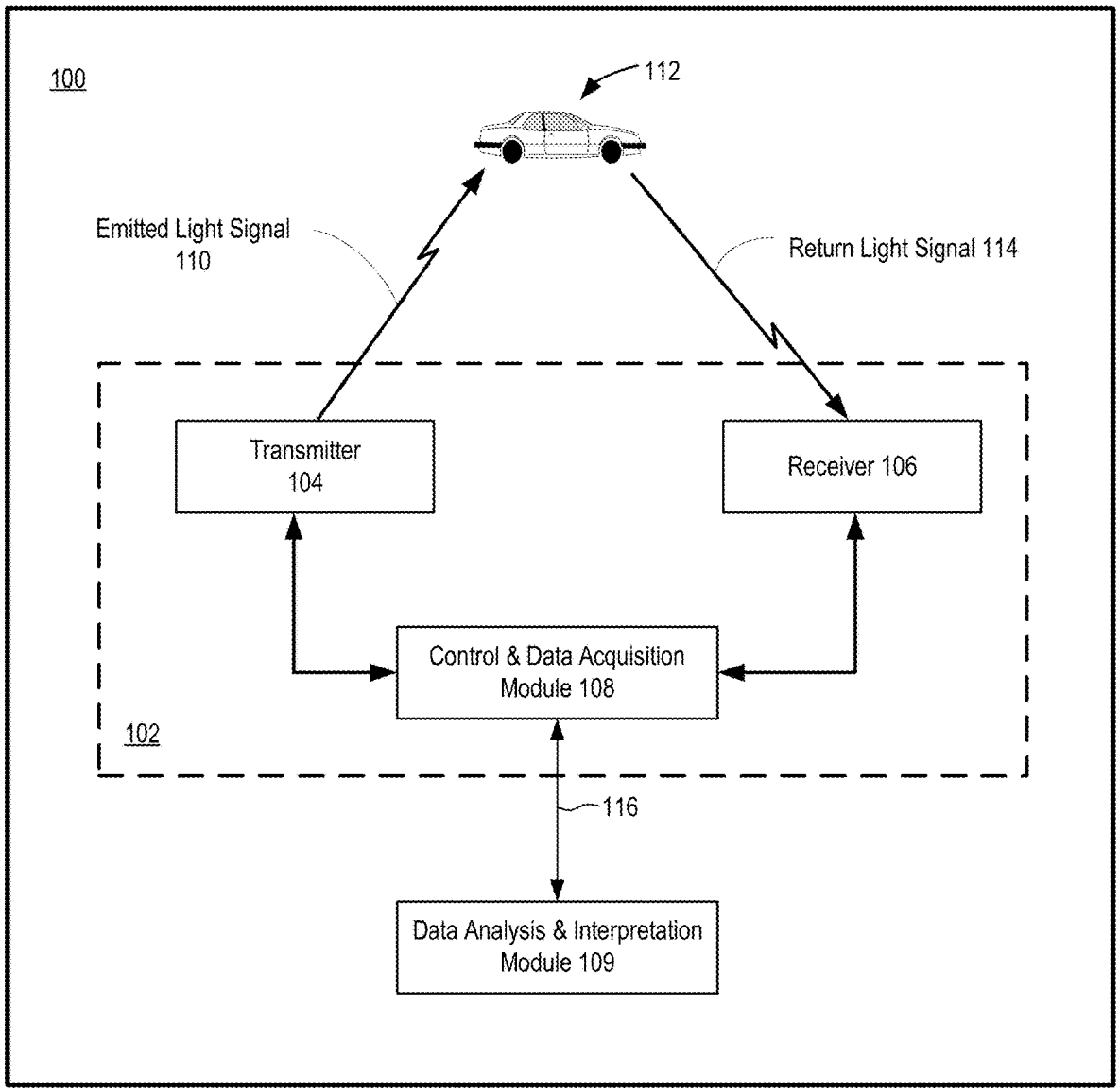
FIG. 1 is an illustration of an exemplary lidar system, in accordance with some embodiments.

While the present disclosure is subject to various modifications and alternative forms, specific embodiments thereof have been shown by way of example in the drawings and will herein be described in detail. The present disclosure should not be understood to be limited to the particular forms disclosed, but on the contrary, the intention is to cover all modifications, equivalents, and alternatives falling within the spirit and scope of the present disclosure.

DETAILED DESCRIPTION

Systems and methods for generating lidar scenes for use in training machine learning models are disclosed. It will be appreciated that, for simplicity and clarity of illustration, where considered appropriate, reference numerals may be repeated among the figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details.

Three of the most significant technical challenges faced by the lidar industry are (1) reducing the manufacturing cost for lidar devices while maintaining existing performance levels, (2) improving the reliability of lidar devices under automotive operating conditions (e.g., weather, temperature, and mechanical vibration), and (3) increasing the range of lidar devices. One approach to reducing manufacturing costs is to reduce the amount of hardware (e.g., channels, transmitters, emitters, receivers, detectors, etc.) in the lidar device while increasing the utilization of the remaining hardware to maintain performance levels. One approach to improving device reliability is to develop lidar devices that use fewer moving mechanical parts (e.g., by eliminating or simplifying mechanical beam scanners). One approach to extending range is to develop lidar devices that use solid-state lasers.

Motivation for and Benefits of Some Embodiments

Existing lidar-based ML algorithms face certain challenges related to accuracy and can often classify objects in a lidar scan or point cloud incorrectly. Taking autonomous driving as an example, data collected by one or more lidar sensors on a vehicle can be interpreted by a machine learning model or other analysis tool in the vehicle (e.g., a data analysis and interpretation system). Low resolution in the lidar data (e.g., point cloud data) and/or inadequate machine learning model training can cause the vehicle's analysis tools to perceive a stop sign as something more innocuous, like a speed limit sign, or to confuse a car-shaped bush with a real car. As another example, when the vehicle's analysis tools misidentify a pedestrian as a lamp post, the vehicle may fail to recognize that the pedestrian may be able to move into the path of the vehicle, which could result in a collision. There is a need to improve the ability of a vehicle to identify objects in a lidar sensor scan.

In general, the ability of ML models to identify objects in a lidar scan can be improved through more rigorous and/or precise training of the ML models. This can involve, for example, use of a larger number of training datasets and/or training datasets that are more varied (e.g., cover a wider range of possible scenarios) and/or realistic. While use of such training datasets can improve model accuracy, the ability to generate a sufficient quantity and quality of training data can be limited by time and/or budget constraints.

Advantageously, the systems and methods described herein can be used to generate accurate and varied training data for lidar-based ML models, in a cost-effective manner. In some embodiments, point cloud data can be collected by a physical lidar sensor for (i) fixed or static objects in a background scene (e.g., a residential area with a street, houses, trees, etc.) and (ii) movable or dynamic objects in a foreground (e.g., a car, a bus, a motorcycle, a bicycle, a vehicle, a pedestrian, a person, an animal, etc.). Various lidar scenes can then be created from the point cloud data. For example, one or more of the foreground objects can be placed into the background scene. This can involve, for example, inserting point cloud data for the one or more foreground objects into the point cloud data for the background scene. The one or more foreground objects can be placed at any desired locations or orientations within the background scene. Properties of the lidar sensor can be specified, such as a sensor type and/or a sensor location in the background scene. An ML model can then be trained based on the generated scene. For example, the ML model can be presented with the point cloud representations of the background scene and the foreground objects, and can learn how to recognize objects in the scene (e.g., from the perspective of the lidar sensor location). Additional point cloud scenes can be generated in this manner. For example, any number and type of foreground objects can be inserted into a variety of background scenes, at any desired locations and orientations. This allows a wide variety of permutations and combinations of background scenes, foreground objects, and sensor types and/or locations to be constructed and used for ML model training. Further, because the point cloud data was collected with a physical sensor in a physical environment with physical objects, the point cloud data is realistic (e.g., compared to previous approaches that generate point cloud data using simulations and without using physical lidar sensors). The approach is efficient because any combination of background scene and foreground objects can be generated without having to drive around with a lidar sensor and wait for such combinations to appear in the real world. Advantageously, the systems and methods described herein are able to construct a large volume of accurate point cloud training data in a cost-effective manner.

While the disclosure herein is mainly described in the context of autonomous transportation, one skilled in the art will recognize that the techniques described in this disclosure may also be applied in other areas of geospatial field detection or in fields where lidar systems and ML algorithms have been developed and applied. For example, the disclosed techniques for augmenting lidar-based training datasets may be utilized in a lidar system that: (i) identifies the locations of fish stocks in oceans to establish fishery catch limits, (ii) scans natural scenes to build landslide risk analysis tools, or (iii) updates elevation models to monitor glaciers, forests, or other natural terrain.

Some Examples of Lidar Systems

A lidar system may be used to measure the shape and contour of the environment surrounding the system. Lidar systems may be applied to numerous applications including autonomous navigation and aerial mapping of surfaces. In general, a lidar system emits light that is subsequently reflected by objects within the environment in which the system operates. The light may be emitted by a laser (e.g., a rapidly firing laser). Laser light travels through a medium and reflects off points of surfaces in the environment (e.g., surfaces of buildings, tree branches, vehicles, etc.). The reflected (and/or scattered) light energy returns to a lidar detector where it may be sensed and used to perceive the environment.

The science of lidar systems is based on the physics of light and optics. Any suitable measurement techniques may be used to determine the attributes of objects in a lidar system's environment. In some examples, the lidar system is configured to emit light pulses (e.g., individual pulses or sequences of pulses). The time each pulse (or pulse sequence) travels from being emitted to being received ("time of flight" or "TOF") may be measured to determine the distance between the lidar system and the object that reflects the pulse. Lidar systems that operate in this way may be referred to as "pulsed lidar," "TOF lidar," "direct TOF lidar," or "pulsed TOF lidar." In some other examples, the time of flight may be calculated indirectly (e.g., using amplitude-modulated continuous wave (AMCW) structured light). Lidar systems that operate in this way may be referred to as "indirect TOF lidar" or "iTOF lidar." In still other examples, the lidar system can be configured to emit continuous wave (CW) light. The wavelength (or frequency) of the received, reflected light may be measured to determine the distance between the lidar system and the object that reflects the light. In some examples, lidar systems can measure the speed (or velocity) of objects. Lidar systems that operate in this way may be referred to as "coherent lidar," "continuous wave lidar," or "CW lidar." In a CW lidar system, any suitable variant of CW lidar sensing may be used. For example, frequency modulated continuous wave (FMCW) lidar sensing may be used.

FIG. 1 depicts the operation of a lidar system 100, according to some embodiments. In the example of FIG. 1, the lidar system 100 includes a lidar device 102, which may include a transmitter 104 that generates and emits a light signal 110, a receiver 106 that detects and processes a return light signal 114, and a control & data acquisition module 108. The transmitter 104 may include a light source (e.g., "optical emitter" or "emitter"), electrical components operable to activate (e.g., drive) and deactivate the light source in response to electrical control signals, and optical components adapted to shape and redirect the light emitted by the light source. The receiver 106 may include a light detector (e.g., "optical detector," "photodetector," or "detector") and optical components adapted to shape return light signals 114 and direct those signals to the detector. In some implementations, one or more optical components (e.g., lenses, mirrors, etc.) may be shared by the transmitter and the receiver.

The lidar device 102 may be referred to as a lidar transceiver or "channel." In operation, the emitted light signal 110 propagates through a medium and reflects off an object(s) 112, whereby a return light signal 114 propagates through the medium and is received by receiver 106. In one example, each lidar channel may correspond to a physical mapping of a single emitter to a single detector (e.g., a one-to-one pairing of a particular emitter and a particular detector). In other examples, however, each lidar channel may correspond to a physical mapping of multiple emitters to a single detector or a physical mapping of a single emitter to multiple detectors (e.g., a "flash" configuration). In some examples, a lidar system 100 may have no fixed channels; rather, light emitted by one or more emitters may be detected by one or more detectors without any physical or persistent mapping of specific emitters to specific detectors.

Any suitable light source may be used including, without limitation, one or more gas lasers, chemical lasers, metal-vapor lasers, solid-state lasers (SSLs) (e.g., Q-switched SSLs, Q-switched solid-state bulk lasers, etc.), fiber lasers (e.g., Q-switched fiber lasers), liquid lasers (e.g., dye lasers), semiconductor lasers (e.g., laser diodes, edge emitting lasers (EELs), vertical-cavity surface emitting lasers (VCSELs), quantum cascade lasers, quantum dot lasers, quantum well lasers, hybrid silicon lasers, optically pumped semiconductor lasers, etc.), and/or any other device operable to emit light. For semiconductor lasers, any suitable gain medium may be used including, without limitation, gallium nitride (GaN), indium gallium nitride (InGaN), aluminum gallium indium phosphide (AlGaInP), aluminum gallium arsenide (AlGaAs), indium gallium arsenide phosphide (InGaAsP), lead salt, etc. For Q-switched lasers, any suitable type or variant of Q-switching can be used including, without limitation, active Q-switching, passive Q-switching, cavity dumping, regenerative Q-switching, etc. The light source may emit light having any suitable wavelength or wavelengths, including but not limited to wavelengths between 100 nm (or less) and 1 mm (or more). Semiconductor lasers operable to emit light having wavelengths of approximately 905 nm, 1300 nm, or 1550 nm are widely commercially available. In some examples, the light source may be operated as a pulsed laser, a continuous-wave (CW) laser, and/or a coherent laser. A light signal (e.g., "optical signal") 110 emitted by a light source may consist of a single pulse, may include a sequence of two or more pulses, or may be a continuous wave.

A lidar system 100 may use any suitable illumination technique to illuminate the system's field of view (FOV). In some examples, the lidar system 100 may illuminate the entire FOV simultaneously. Such illumination techniques may be referred to herein as "flood illumination" or "flash illumination." In some examples, the lidar system 100 may illuminate fixed, discrete spots throughout the FOV simultaneously. Such illumination techniques may be referred to herein as "fixed spot illumination." In some examples, the lidar system 100 may illuminate a line within the FOV and use a scanner (e.g., a 1D scanner) to scan the line over the entire FOV. Such illumination techniques may be referred to herein as "scanned line illumination." In some examples, the lidar system 100 may simultaneously illuminate one or more spots within the FOV and use a scanner (e.g., a 1D or 2D scanner) to scan the spots over the entire FOV. Such illumination techniques may be referred to herein as "scanned spot illumination."

Any suitable optical detector may be used including, without limitation, one or more photodetectors, contact image sensors (CIS), solid-state photodetectors (e.g., photodiodes (PD), single-photon avalanche diode (SPADs), avalanche photodiodes (APDs), etc.), photomultipliers (e.g., silicon photomultipliers (SiPMs), and/or any other device operable to convert light (e.g., optical signals) into electrical signals. In some examples, CIS can be fabricated using a complementary metal-oxide semiconductor (CMOS) process. In some examples, solid-state photodetectors can be fabricated using semiconductor processes similar to CMOS. Such semiconductor processes may use silicon, germanium, indium gallium arsenide, lead (II) sulfide, mercury cadmium, telluride, $MoS_2$, graphene, and/or any other suitable material(s). In some examples, an array of integrated or discrete CIS or solid-state photodetectors can be used to simultaneously image (e.g., perform optical detection across) the lidar device's entire field of view or a portion thereof. In general, solid-state photodetectors may be configured to detect light having wavelengths between 190 nm (or lower) and 1.4 µm (or higher). PDs and APDs configured to detect light having wavelengths of approximately 905 nm, 1300 nm, or 1550 nm are widely commercially available.

The lidar system 100 may include any suitable combination of measurement technique(s), light source(s), illumination technique(s), and detector(s). Some combinations may be more accurate or more economical on certain conditions. For example, some combinations may be more economical for short-range sensing but incapable of provide accurate measurements at longer ranges. Some combinations may pose potential hazards to eye safety, while other combinations may reduce such hazards to negligible levels.

The control & data acquisition module 108 may control the light emission by the transmitter 104 and may record data derived from the return light signal 114 detected by the receiver 106. In some embodiments, the control & data acquisition module 108 controls the power level at which the transmitter 104 operates when emitting light. For example, the transmitter 104 may be configured to operate at a plurality of different power levels, and the control & data acquisition module 108 may select the power level at which the transmitter 104 operates at any given time. Any suitable technique may be used to control the power level at which the transmitter 104 operates. In some embodiments, the control & data acquisition module 108 or the receiver 106 determines (e.g., measures) particular characteristics of the return light signal 114 detected by the receiver 106. For example, the control & data acquisition module 108 or receiver 106 may measure the intensity of the return light signal 114 using any suitable technique.

Operational parameters of the transceiver 102 may include its horizontal field of view ("FOV") and its vertical FOV. The FOV parameters effectively define the region of the environment that is visible to the specific lidar transceiver 102. More generally, the horizontal and vertical FOVs of a lidar system 100 may be defined by combining the fields of view of a plurality of lidar devices 102.

To obtain measurements of points in its environment and generate a point cloud based on those measurements, a lidar system 100 may scan its FOV. A lidar transceiver system 100 may include one or more beam-steering components (not shown) to redirect and shape the emitted light signals 110 and/or the return light signals 114. Any suitable beam-steering components may be used including, without limitation, mechanical beam steering components (e.g., rotating assemblies that physically rotate the transceiver(s) 102, rotating scan mirrors that deflect emitted light signals 110 and/or return light signals 114, etc.), optical beam steering components (e.g., lenses, lens arrays, microlenses, microlens arrays, beam splitters, etc.), microelectromechanical (MEMS) beam steering components (e.g., MEMS scan mirrors, etc.), solid-state beam steering components (e.g., optical phased arrays, optical frequency diversity arrays, etc.), etc.

In some implementations, the lidar system 100 may include or be communicatively coupled to a data analysis & interpretation module 109, which may receive outputs (e.g., via a connection 116) from the control & data acquisition module 108 and may perform data analysis on those outputs. By way of example and not limitation, connection 116 may be implemented using wired or wireless (e.g., non-contact communication) technique(s).

Figure 2A:
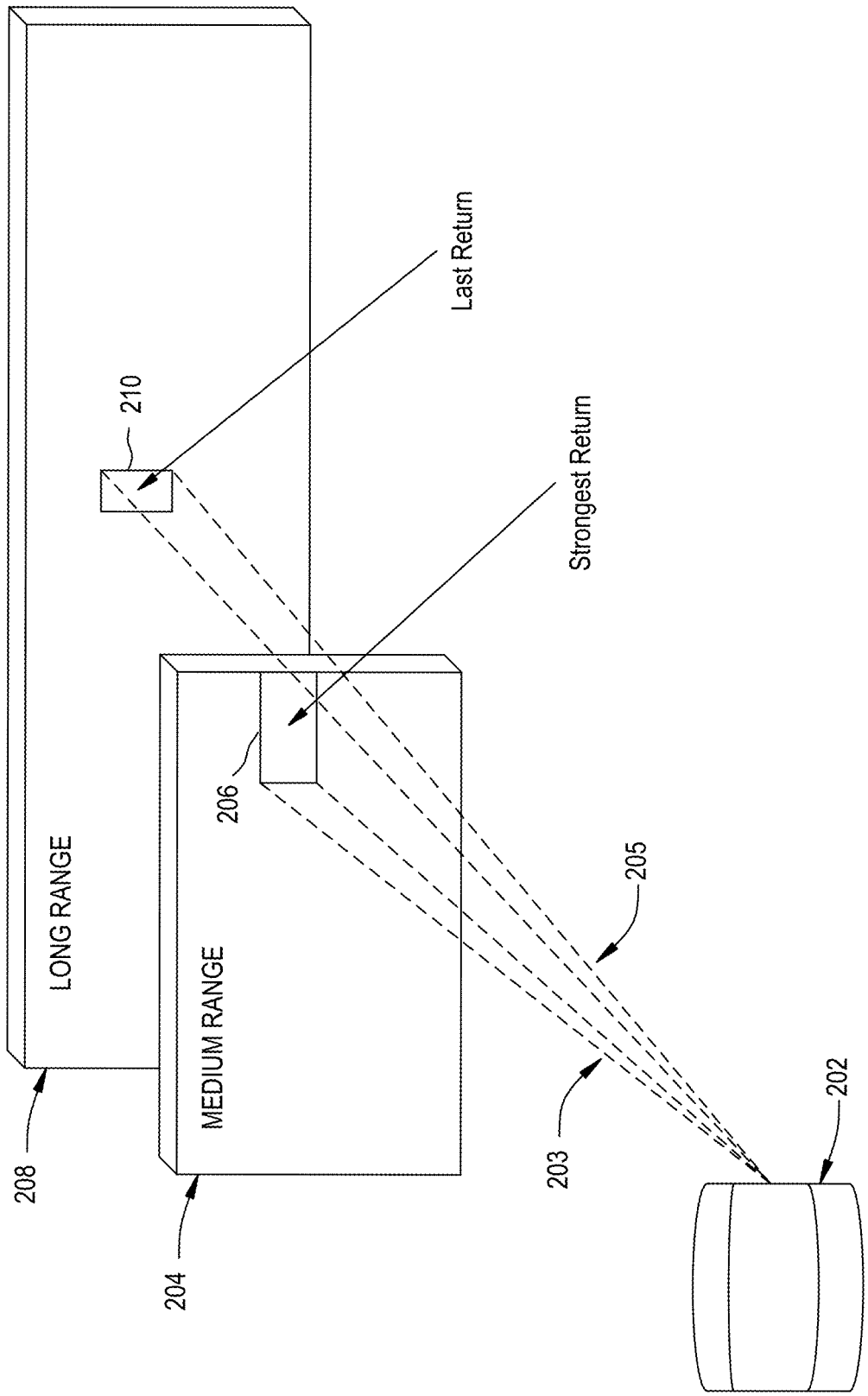
FIG. 2A is an illustration of the operation of a lidar system, in accordance with some embodiments.

FIG. 2A illustrates the operation of a lidar system 202, in accordance with some embodiments. In the example of FIG. 2A, two return light signals 203 and 205 are shown. Because laser beams generally tend to diverge as they travel through a medium, a single laser emission may hit multiple objects at different ranges from the lidar system 202, producing multiple return signals 203, 205. The lidar system 202 may analyze multiple return signals 203, 205 and report one of the return signals (e.g., the strongest return signal, the last return signal, etc.) or more than one (e.g., all) of the return signals. In the example of FIG. 2A, lidar system 202 emits laser light in the direction of near wall 204 and far wall 208. As illustrated, the majority of the emitted light hits the near wall 204 at area 206 resulting in a return signal 203, and another portion of the emitted light hits the far wall 208 at area 210 resulting in a return signal 205. Return signal 203 may have a shorter TOF and a stronger received signal strength compared to return signal 205. In both single- and multiple-return lidar systems, it is important that each return signal is accurately associated with the transmitted light signal so that one or more attributes of the object reflecting the light signal (e.g., range, velocity, reflectance, etc.) can be correctly estimated.

Some embodiments of a lidar system may capture distance data in a two-dimensional ("2D") (e.g., within a single plane) point cloud manner. These lidar systems may be used in industrial applications, or for surveying, mapping, autonomous navigation, and other uses. Some embodiments of these systems rely on the use of a single laser emitter/detector pair combined with a moving mirror to effect scanning across at least one plane. This mirror may reflect the emitted light from the transmitter (e.g., laser diode), and/or may reflect the return light to the receiver (e.g., to the detector). Use of a movable (e.g., oscillating) mirror in this manner may enable the lidar system to achieve 90-180-360 degrees of azimuth (horizontal) view while simplifying both the system design and manufacturability. Many applications require more data than just a 2D plane. The 2D point cloud may be expanded to form a 3D point cloud, in which multiple 2D point clouds are used, each corresponding to a different elevation (e.g., a different position and/or direction with respect to a vertical axis). Operational parameters of the receiver of a lidar system may include the horizontal FOV and the vertical FOV.

Figure 2B:
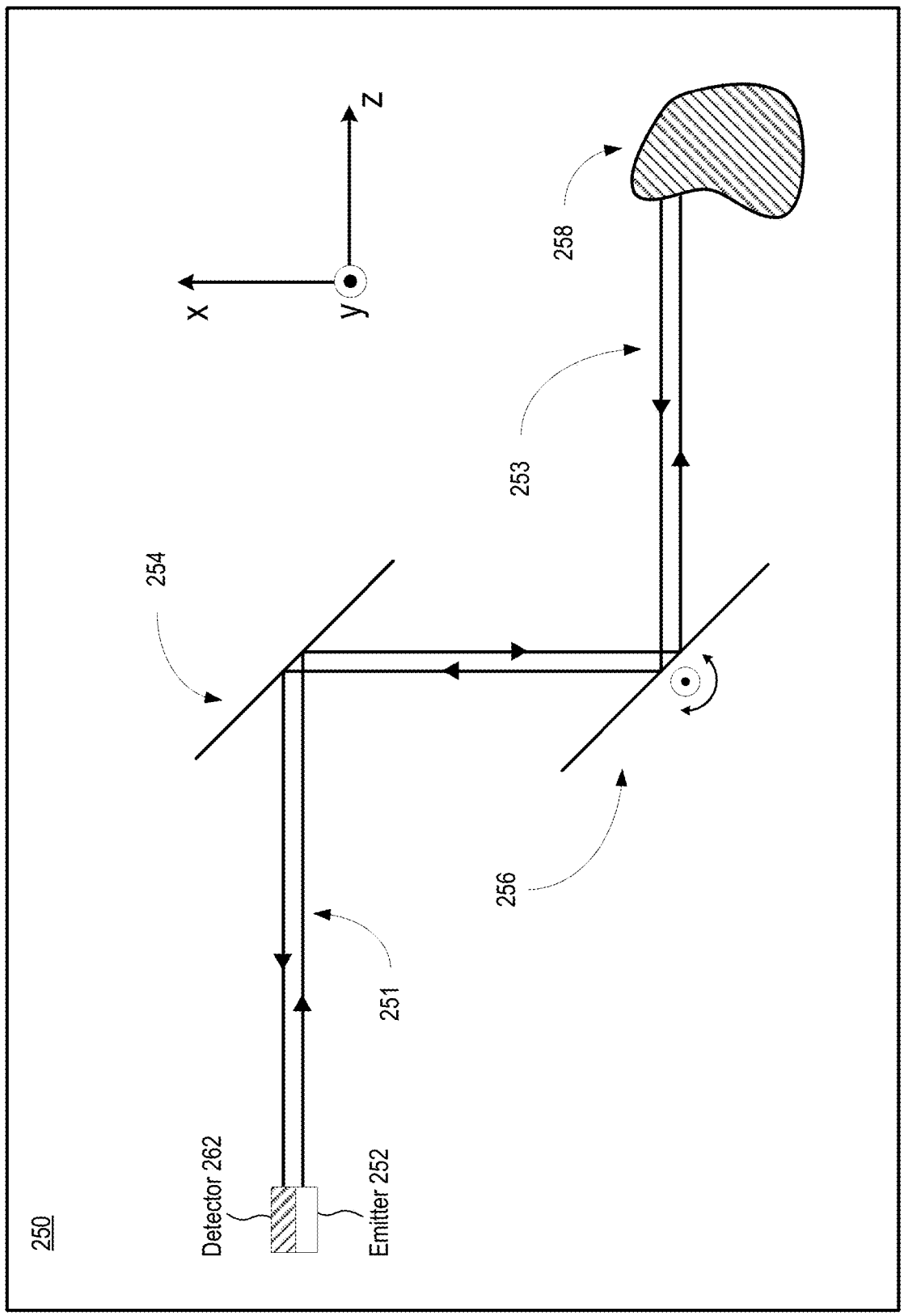
FIG. 2B is an illustration of optical components of a channel of a lidar system with a movable mirror, in accordance with some embodiments.

FIG. 2B depicts a lidar system 250 with a movable (e.g., rotating or oscillating) mirror, according to some embodiments. In the example of FIG. 2B, the lidar system 250 uses a single emitter 252/detector 262 pair combined with a fixed mirror 254 and a movable mirror 256 to effectively scan across a plane. Distance measurements obtained by such a system may be effectively two-dimensional (e.g., planar), and the captured distance points may be rendered as a 2D (e.g., single plane) point cloud. In some embodiments, but without limitation, the movable mirror 256 may oscillate at very fast speeds (e.g., thousands of cycles per minute).

The emitted laser signal 251 may be directed to a fixed mirror 254, which may reflect the emitted laser signal 251 to the movable mirror 256. As movable mirror 256 moves (e.g., oscillates), the emitted laser signal 251 may reflect off an object 258 in its propagation path. The reflected return signal 253 may be coupled to the detector 262 via the movable mirror 256 and the fixed mirror 254. In some embodiments, the movable mirror 256 is implemented with mechanical technology or with solid state technology (e.g., MEMS).

Figure 2C:
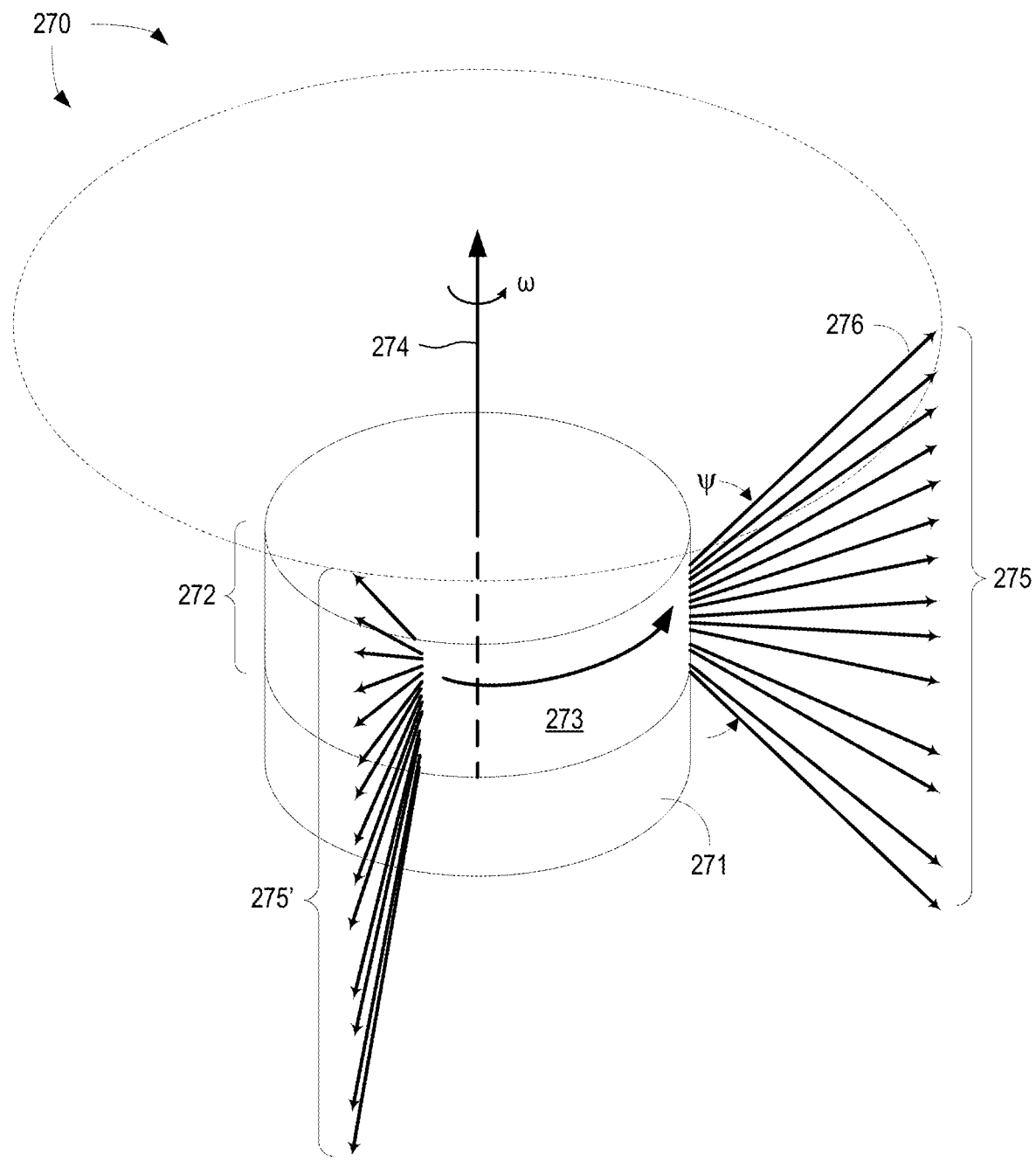
FIG. 2C is an illustration of an example of a 3D lidar system, in accordance with some embodiments.

FIG. 2C depicts a 3D lidar system 270, according to some embodiments. In the example of FIG. 2C, the 3D lidar system 270 includes a lower housing 271 and an upper housing 272. The upper housing 272 includes a cylindrical shell element 273 constructed from a material that is transparent to infrared light (e.g., light having a wavelength within the spectral range of 700 to 1,700 nanometers). In one example, the cylindrical shell element 273 is transparent to light having wavelengths centered at 905 nanometers.

In some embodiments, the 3D lidar system 270 includes a lidar transceiver, such as transceiver 102 shown in FIG. 1, operable to emit laser beams 276 through the cylindrical shell element 273 of the upper housing 272. In the example of FIG. 2C, each individual arrow in the sets of arrows 275, 275' directed outward from the 3D lidar system 270 represents a laser beam 276 emitted by the 3D lidar system. Each beam of light emitted from the system 270 (e.g., each laser beam 276) may diverge slightly, such that each beam of emitted light forms a cone of light emitted from system 270. In one example, a beam of light emitted from the system 270 illuminates a spot size of 20 centimeters in diameter at a distance of 100 meters from the system 270.

In some embodiments, the transceiver 102 emits each laser beam 276 transmitted by the 3D lidar system 270. The direction of each emitted beam may be determined by the angular orientation ω of the transceiver's transmitter 104 with respect to the system's central axis 274 and by the angular orientation Ψ of the transmitter's movable mirror (e.g., similar or identical to movable mirror 256 shown in FIG. 2B) with respect to the mirror's axis of oscillation (or rotation). For example, the direction of an emitted beam in a horizontal dimension may be determined by the transmitter's angular orientation ω, and the direction of the emitted beam in a vertical dimension may be determined by the angular orientation $\Psi$ of the transmitter's movable mirror. Alternatively, the direction of an emitted beam in a vertical dimension may be determined by the transmitter's angular orientation $\omega$, and the direction of the emitted beam in a horizontal dimension may be determined by the angular orientation $\Psi$ of the transmitter's movable mirror. (For purposes of illustration, the beams of light 275 are illustrated in one angular orientation relative to a non-rotating coordinate frame of the 3D lidar system 270 and the beams of light 275' are illustrated in another angular orientation relative to the non-rotating coordinate frame.)

The 3D lidar system 270 may scan a particular point (e.g., pixel) in its field of view by adjusting the angular orientation $\omega$ of the transmitter and the angular orientation $\Psi$ of the transmitter's movable mirror to the desired scan point ($\omega$, $\Psi$) and emitting a laser beam from the transmitter 104. Accordingly, the 3D lidar system 270 may systematically scan its field of view by adjusting the angular orientation $\omega$ of the transmitter and the angular orientation $\Psi$ of the transmitter's movable mirror to a set of scan points ($\omega_i$, $\Psi_j$) and emitting a laser beam from the transmitter 104 at each of the scan points.

Assuming that the optical component(s) (e.g., movable mirror 256) of a lidar transceiver remain stationary during the time period after the transmitter 104 emits a laser beam 110 (e.g., a pulsed laser beam or "pulse" or a CW laser beam) and before the receiver 106 receives the corresponding return beam 114, the return beam generally forms a spot centered at (or near) a stationary location LO on the detector. This time period is referred to herein as the "ranging period" or "listening period" of the scan point associated with the transmitted beam 110 and the return beam 114.

In many lidar systems, the optical component(s) of a lidar transceiver do not remain stationary during the ranging period of a scan point. Rather, during a scan point's ranging period, the optical component(s) may be moved to orientation(s) associated with one or more other scan points, and the laser beams that scan those other scan points may be transmitted. In such systems, absent compensation, the location Li of the center of the spot at which the transceiver's detector receives a return beam 114 generally depends on the change in the orientation of the transceiver's optical component(s) during the ranging period, which depends on the angular scan rate (e.g., the rate of angular motion of the movable mirror 256) and the range to the object 112 that reflects the transmitted light. The distance between the location Li of the spot formed by the return beam and the nominal location LO of the spot that would have been formed absent the intervening rotation of the optical component(s) during the ranging period is referred to herein as "walk-off."

Figure 2D:
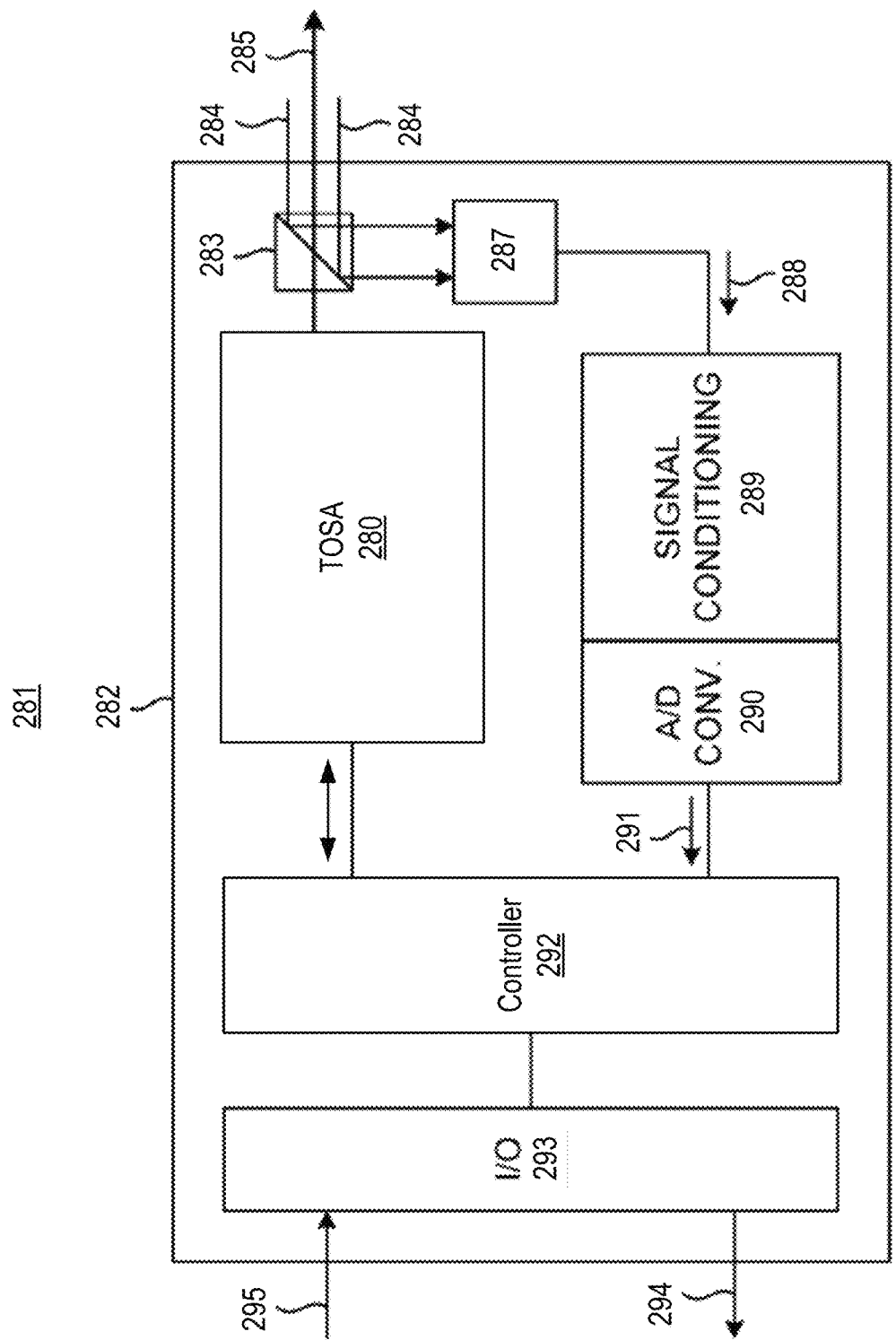
FIG. 2D is a block diagram of a transmitter-receiver optical sub-assembly (TROSA), according to some embodiments.

Referring to FIG. 2D, a block diagram of a transmitter-receiver optical subassembly (TROSA) 281 is shown, according to some embodiments. In some embodiments, the TROSA 281 may include a TOSA 280, an optical detector 287, a beam splitter 283, signal conditioning electronics 289, an analog to digital (A/D) converter 290, controller 292, and digital input/output (I/O) electronics 293. In some embodiments, the TROSA components illustrated in FIG. 2D are integrated onto a common substrate 282 (e.g., printed circuit board, ceramic substrate, etc.). In some embodiments, the TROSA components illustrated in FIG. 2D are individually mounted to a common substrate 282. In some embodiments, groups of these components are packaged together and the integrated package(s) is/are mounted to the common substrate.

The TOSA 280 may include one or more light sources and may operate the light source(s) safely within specified safety thresholds. A light source of the TOSA may emit an optical signal (e.g., laser beam) 285.

A return signal 284 may be detected by the TROSA 281 in response to the optical signal 285 illuminating a particular location. For example, the optical detector 287 may detect the return signal 284 and generate an electrical signal 288 based on the return signal 284. The controller 292 may initiate a measurement window (e.g., a period of time during which collected return signal data are associated with a particular emitted light signal 285) by enabling data acquisition by optical detector 287. Controller 292 may control the timing of the measurement window to correspond with the period of time when a return signal is expected in response to the emission of an optical signal 285. In some examples, the measurement window is enabled at the time when the optical signal 285 is emitted and is disabled after a time period corresponding to the time of flight of light over a distance that is substantially twice the range of the lidar device in which the TROSA 281 operates. In this manner, the measurement window is open to collect return light from objects adjacent to the lidar device (e.g., negligible time of flight), objects that are located at the maximum range of the lidar device, and objects in between. In this manner, other light that does not contribute to a useful return signal may be rejected.

In some embodiments, the signal analysis of the electrical signal 288 produced by the optical detector 287 is performed by the controller 292, entirely. In such embodiments, the signals 294 provided by the TROSA 281 may include an indication of the distances determined by controller 292. In some embodiments, the signals 294 include the digital signals 291 generated by the A/D converter 290. These raw measurement signals 291 may be processed further by one or more processors located on board the lidar device or external to the lidar device to arrive at a measurement of distance. In some embodiments, the controller 292 performs preliminary signal processing steps on the signals 291 and the signals 294 include processed data that are further processed by one or more processors located on board the lidar device or external to the lidar device to arrive at a measurement of distance.

In some embodiments a lidar device (e.g., a lidar device 100, 202, 250, or 270) includes multiple TROSAs 281. In some embodiments, a delay time is enforced between the firing of each TROSA and/or between the firing of different light sources within the same TROSA. In some examples, the delay time is greater than the time of flight of the light signal 285 to and from an object located at the maximum range of the lidar device, to reduce or avoid optical cross-talk among any of the TROSAs 281. In some other examples, an optical signal 285 is emitted from one TROSA 281 before a return signal corresponding to a light signal emitted from another TROSA 281 has had time to return to the lidar device. In these embodiments, there may be sufficient spatial separation between the areas of the surrounding environment interrogated by the light signals of these TROSAs to avoid optical cross-talk.

In some embodiments, digital I/O 293, A/D converter 290, and signal conditioning electronics 289 are integrated onto a single, silicon-based microelectronic chip. In another embodiment, these same elements are integrated into a single gallium-nitride or silicon based circuit that also includes components of the TOSA 280 (e.g., an illumination driver). In some embodiments, the A/D converter 290 and controller 292 are combined as a time-to-digital converter.

As depicted in FIG. 2D, return light 284 reflected from the surrounding environment is detected by optical detector 287. In some embodiments, optical detector 287 includes one or more avalanche photodiodes (APDs) and/or single-photon avalanche diodes (SPADs). Any suitable optical detector may be used. In some embodiments, optical detector 287 generates an output signal 288 that is amplified by signal conditioning electronics 289. In some embodiments, signal conditioning electronics 289 include an analog trans-impedance amplifier. However, in general, the amplification of output signal 288 may include multiple amplifier stages. In this sense, an analog transimpedance amplifier is provided by way of non-limiting example, as many other analog signal amplification schemes may be used.

In some embodiments, the amplified signal is communicated to A/D converter 290, and the digital signals generated by the A/D converter are communicated to controller 292. Controller 292 may generate an enable/disable signal to control the timing of data acquisition by ADC 290.

As depicted in FIG. 2D, the optical signal 285 emitted from the TROSA 281 and the return signal 284 directed toward the TROSA 281 share a common path within the lidar device. In the embodiment depicted in FIG. 2D, the return light 284 is separated from the emitted light 285 by a beam splitter 283. The beam splitter may direct the light 285 emitted by the TOSA 280 toward the lidar device's environment, and direct the return light 284 to the optical detector 287. Any suitable beam splitter may be used, including (without limitation) a polarizing beam splitter, nonpolarizing beam splitter, dielectric film, etc.). Some non-limiting examples of suitable beam splitters are described in International Patent Publication No. WO 2017/164989.

Training Datasets Used in Lidar-Based ML

In various examples, a lidar system can be utilized in autonomous transportation, in which one or more lidar sensors are arranged on a vehicle to collect environment data, and lidar-based ML algorithms analyze the environment data. To enable the vehicle to safely and accurately navigate the environment, the ML algorithms should be able to distinguish between various objects detected in the environment data, including vehicles (e.g., cars, trucks, motorcycles, and bicycles), pedestrians, animals, plants, lamp posts, street signs, and other objects. The ability of the ML algorithms to identify such objects can be improved by training the ML algorithms with accurate training data representing a wide variety of environments that may be encountered by the vehicle. Such environments can include a background scene (e.g., a residential area, a downtown area, a highway, a road, a sidewalk, a city, natural features, and/or natural terrain) with foreground objects (e.g., vehicles, pedestrians, trees, etc.).

Figure 3A:
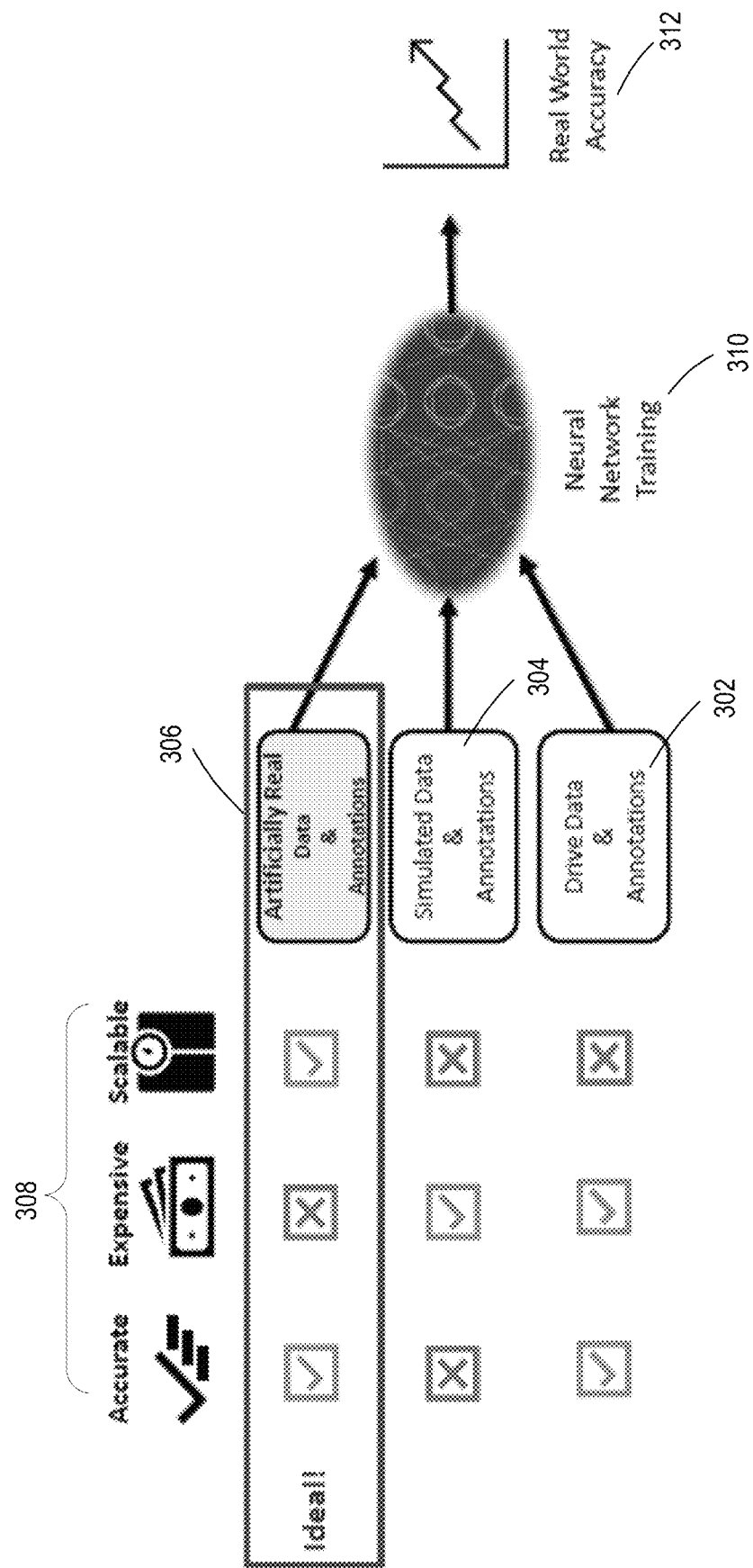
FIG. 3A includes a comparison of three types of datasets that can be used to train lidar-based ML algorithms for autonomous driving, in accordance with some embodiments.

FIG. 3A illustrates three types of datasets that can be used to train a lidar-based ML algorithm for autonomous driving, in accordance with some embodiments. The three types of datasets include: drive data 302, simulated data 304, and artificially real data 306. Selecting which type of training dataset to use can depend on (i) how accurate the ML algorithm will be when trained with the dataset, (ii) how expensive the dataset is to generate (e.g., including a cost of annotating objects in the dataset), and (iii) how easy it is to scale the dataset (e.g., to cover a large number of environments and objects, in various combinations and permutations). In other words, each of the datasets 302, 304, and 306 can be assessed based on accuracy, expense, and scalability, as shown in columns 308.

To generate the drive data 302 dataset, one or more lidar sensors can be placed on a vehicle and used to collect point cloud data as the vehicle is traveling through an environment (e.g., driving down a city street). The collected data can then be annotated (e.g., to label objects in the environment) and used to train an ML algorithm or model. Because the drive data 302 is generated using a lidar sensor in a real environment, the accuracy of ML models trained with such data can be high. The cost to generate the drive data 302, however, can also be high, due to time and effort associated with collecting and annotating such data (e.g., 3D lidar data). Further, the drive data 302 may not be scalable. To generate drive data 302 for a scene having a different background and/or different foreground objects, for example, the vehicle may need to travel through that particular scene so that lidar data for the scene can be collected and annotated.

In various cases, the simulated data 304 can include synthetic point cloud data generated using a 3D virtual model, which can utilize or include, for example, a mesh of a scene, a virtual lidar sensor, and a 3D rendering engine. Simulated data 304 can be highly scalable and manipulable, can be easy to generate, can avoid privacy concerns, and, more importantly, can fill data gaps where real data is difficult to obtain or not feasible. Use of simulated data 304 in lidar-based ML algorithms can be attractive because the simulated data 304 provides freedom in scene creation; however, there are certain drawbacks associated with the use of simulated data 304. For example, compared to a real or physical lidar sensor, the 3D virtual model (e.g., mesh) used to generate point clouds for the simulated data 304 may not represent the shape or reflectance of each surface accurately. Additionally, the 3D virtual models (e.g., created by mesh artists) can be difficult to scale and/or can be expensive to generate for a large number of background scenes and foreground objects, in various combinations. Further, simulated data 304 may be unrealistic due to a lack of noise present in real data, which can be difficult to model and/or can vary depending on the type of lidar sensor being used. Simulated data 304 may therefore be inaccurate, compared to lidar data obtained with a physical sensor in a real environment.

The inaccuracies associated with simulated data 304 are illustrated in Table 1, below, which includes accuracy values for two different ML algorithms and two different datasets. The two ML algorithms include an ML algorithm trained using simulated data 304 (referred to as "simulation-based ML algorithm") and an ML algorithm trained using drive data 302 (referred to as "real data-based ML algorithm"). The accuracy of these ML algorithms was evaluated using two different datasets: a "simulated" dataset (including simulated data 304) and a "real" dataset (including drive data 302). Accuracy is presented as average recall rate, which is a percentage of objects that were identified accurately by the ML algorithms for each dataset. The table indicates that the simulation-based ML algorithm had a higher accuracy when presented with the simulated dataset (i.e., 90.3% average recall rate) and a lower accuracy when presented with the real dataset (i.e., 65.6% average recall rate). The real data-based ML algorithm had a low accuracy when presented with the simulated dataset (i.e., 16.2% average recall rate) and higher accuracy when presented with the real dataset (i.e., 75.2% average recall rate). The accuracy shortcomings of the two models presented in Table 1 indicate that a new type of training dataset is needed that is accurate, scalable, and inexpensive to generate.

TABLE 1

Average recall rate for two ML algorithms and two datasets.

| Dataset | Average Recall Rate | |
| --- | --- | --- |
| | Simulation-Based ML Algorithm | Real Data-Based ML Algorithm |
| Simulated | 90.3% | 16.2% |
| Real | 65.6% | 75.2% |

Referring again to FIG. 3A, the artificially real data 306 dataset can be generated from point cloud data obtained from one or more physical lidar sensors in a physical environment. For example, point cloud data can be obtained for multiple background scenes and for multiple foreground objects, and the artificially real data 306 dataset can include a combination of the point cloud data for one of the background scenes and one or more of the foreground objects placed within the background scene. Compared to the drive data 302 and simulated data 304 datasets, the artificially real data 306 dataset can be the least expensive to generate. Also, the artificially real data 306 can be based on real lidar sensor data (e.g., obtained using a physical lidar sensor), which avoids inaccuracies associated with simulated data 304, as described above. Further, the artificially real data 306 has the advantage of being scalable to cover any desired combination of a background scene and one or more foreground objects. The procedure for generating an artificially real data 306 dataset is described in more detail below, for example, with reference to FIGS. 4A-5.

Still referring to FIG. 3A, once a training dataset has been generated (e.g., including point cloud data and object annotations), the dataset can be used to train an ML model 310 (e.g., a neural network). The trained ML model 310 can then receive data from a lidar sensor (e.g., point cloud data) and identify objects (e.g., roads, vehicles, pedestrians, trees, etc.) in an environment being sensed by the lidar sensor. Based on the identified objects, the ML model 310 and/or other software or hardware components can provide instructions to a vehicle for navigating the environment. This can include, for example, determining a path and/or an action for the vehicle (e.g., calculating a steering angle and/or a speed required to avoid an object or stay within a highway lane). In general, an accuracy 312 of the ML model 310 for identifying objects and providing vehicle instructions can be improved using the systems and methods described herein.

Figure 3B:
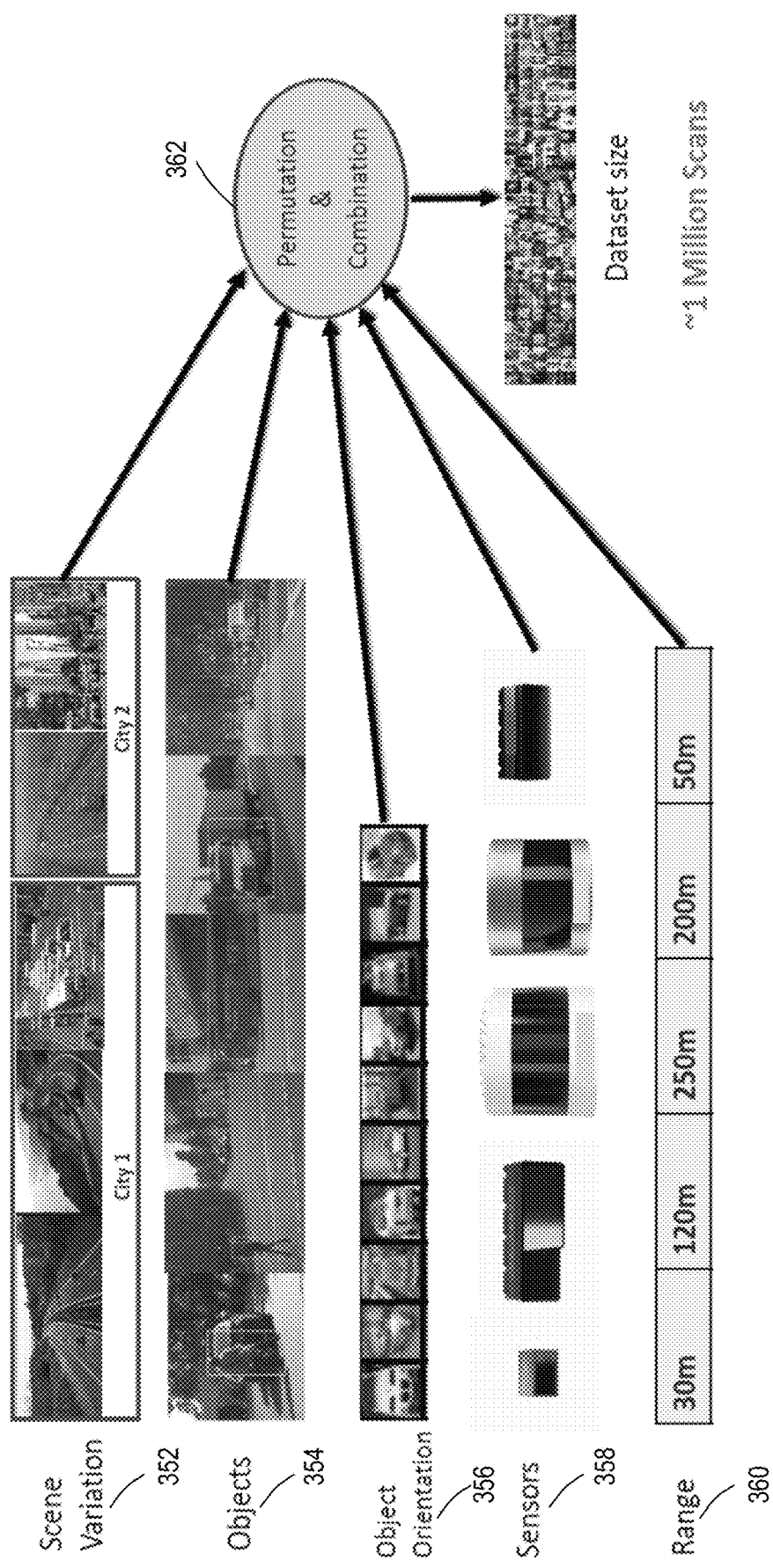
FIG. 3B is an illustration of example factors that can be considered when generating a training dataset for lidar-based ML algorithms, in accordance with some embodiments.

FIG. 3B illustrates various factors to be considered when generating a training dataset for a lidar-based ML model, in accordance with some embodiments. In various examples, a trained lidar-based ML model should be robust (e.g., accurate and efficient) for a wide variety of permutations and combinations of factors, including, for example, background scene 352 (e.g., street scene, residential scene, city scene, mountain scene, nighttime, daytime, etc.), foreground objects 354 that can be present in the scene 352 (e.g., cars, buses, and pedestrians), an orientation 356 and/or position of each object in the scene 352, a type of lidar sensor 358 being used, and/or a range 360 (or signal-to-noise ratio) for the sensor 358. For example, the ML model should be able to identify an object 354 in a variety of scenes 352, at a variety of distances from the sensor 358 (e.g., 5 m, 50 m, 100 m, or 150 m, or more), and for a variety of object orientations (e.g., facing the sensor or facing away from the sensor). The ML model should consider the type of sensor 358 being used, given that the scene 352 and objects 354 may look different depending on the sensor type. A training dataset covering all these permutations and combinations 362 can be large (e.g., including over one million lidar scans or scenes with objects) and difficult to generate. Advantageously, the systems and methods described herein can reduce the time and cost associated with generating such training datasets.

Artificially Real Lidar Scene Generation

In various examples, "artificially real" training datasets can be generated by combining lidar point cloud data for a background scene with lidar point cloud data for one or more foreground objects. Such datasets can be referred to as "real" because they contain point cloud data generated with real or physical lidar sensors in real or physical environments. This is in contrast to simulated point cloud data generated with a 3D virtual mesh, as described above. Such datasets can be referred to as "artificially" real because they can include point cloud data for a background scene and one or more foreground objects in a combination that may not have existed in reality or may not have been measured or scanned by a physical lidar sensor all at once. For example, the artificially real lidar training dataset can include point cloud data representing a background scene and one or more objects inserted into the background scene, at various object positions and orientations. The point cloud data for the background scene and the point cloud data for the objects can be collected during separate lidar measurements or scans (e.g., one scan to collect data for the background scene and a separate scan(s) to collect data for the object(s)). The point cloud data for the background scene and the objects can then be merged together into a single set of point cloud data representing the objects placed within the background scene. Compared to the simulated data or drive data described herein, artificially real datasets can be easier to generate, can have improved scalability, and can result in ML models having more accurate object recognition. In various examples, an "artificially real" dataset or scene can also be referred to herein as a "generated lidar scene" or simply as a "lidar scene."

In general, the training datasets used to train lidar-based ML models can include or represent data (e.g., point cloud data) for both static objects and dynamic objects. The static objects can include stationary objects in a background scene, such as, for example, buildings, trees, utility poles, road signs, guardrails, etc. The dynamic objects can include movable objects (e.g., in a foreground), such as, for example, cars, buses, bicycles, pedestrians, etc. In a lidar system, the background scene (and the static objects) can change or move as a vehicle changes location, for example, from road to road, city to city, etc. As the background scene changes, the static objects in the background scene can also change. The dynamic objects can have high variability in shape, reflectance, position, and orientation within a given background scene and/or with respect to lidar sensors. For example, the dynamic objects can be present in a wide variety of types, numbers, positions, and/or orientations, in a single background scene.

Figure 4A:
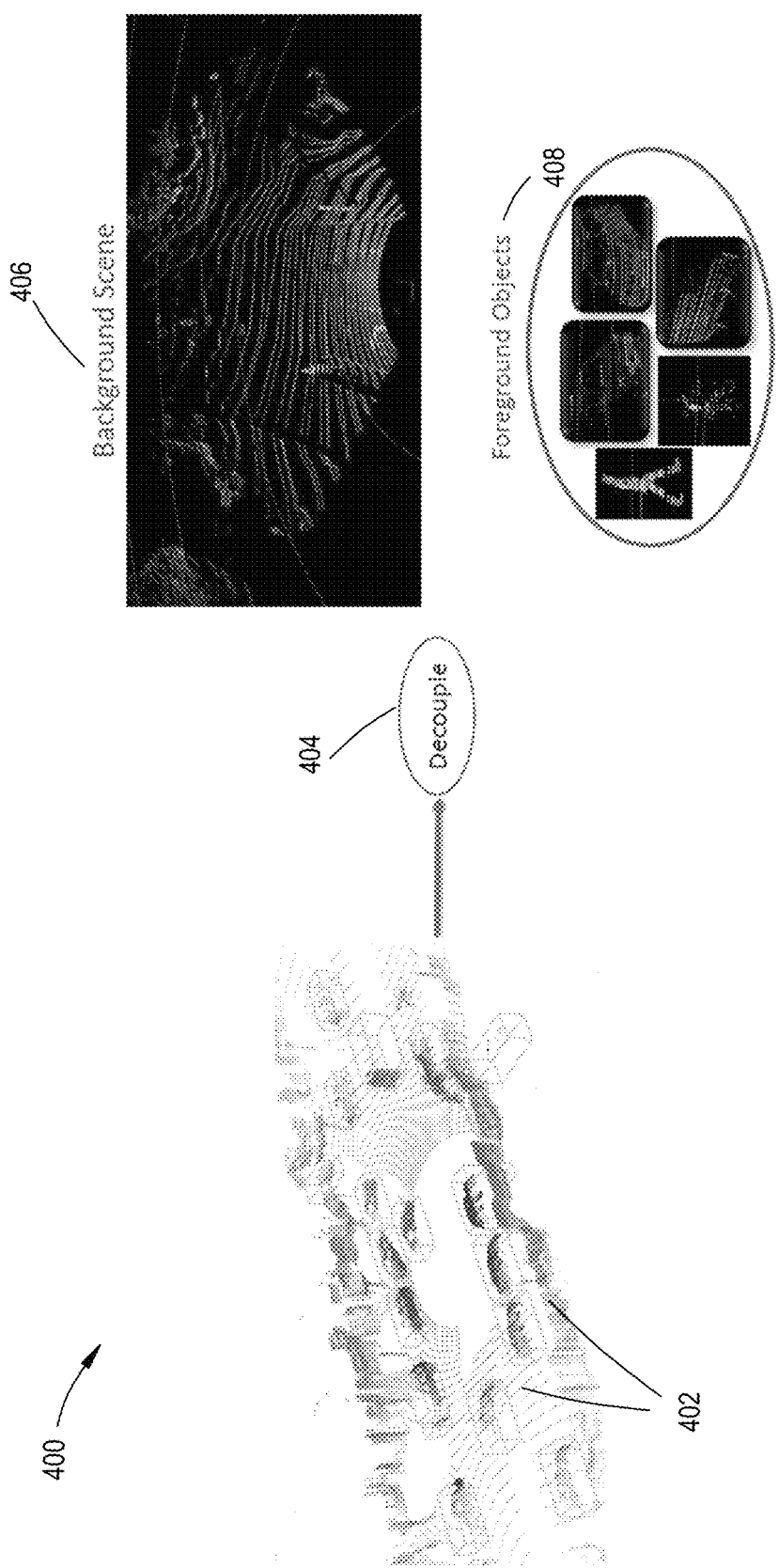
FIG. 4A is a schematic diagram of a process for separating lidar point cloud data for a scene into point cloud representations for a background scene and for one or more foreground objects, in accordance with some embodiments.

FIG. 4A illustrates a process for decoupling a lidar point cloud into a background scene and one or more foreground objects, in accordance with some embodiments. Point cloud data for a scene 400 can be obtained by performing a scan using a lidar sensor. Dynamic objects 402 in the scene 400 can be identified in the point cloud data (e.g., manually or automatically). This can involve, for example, taking multiple scans to identify objects that moved from scan-to-scan. In some cases, to avoid false positives, only objects associated with a high confidence score (e.g., over a pre-defined threshold) may be recognized as objects. The dynamic objects 402 can be annotated and/or labeled (e.g., with boxes encompassing the objects). Such annotating or labeling can be performed manually or automatically (e.g., for supervised or unsupervised training). The annotated dynamic objects 402 can then be decoupled 404 or removed from the scene 400 to create an "empty" background scene 406 (e.g., with no dynamic objects 402) and separate foreground objects 408 (representing the original dynamic objects 402).

In various examples, point cloud data for the background scene 406 and for the foreground objects 408 can be stored and maintained in one or more databases. The stored point cloud data can then be used to generate (e.g., using simulation techniques) lidar scenes or datasets having the background scene 400 and dynamic objects 402 in various permutations and combinations. For example, the foreground objects 408 may be placed at different positions and orientations within the background scene 406 to create a variety of scenes represented by point cloud data. Advantageously, the labels or annotations identifying the foreground objects 408 can remain attached to the foreground objects 408 during the lidar scene generation process. Once a foreground object 408 has been labeled, for example, the foreground object 408 can be retrieved (e.g., from a database), placed into a scene, repositioned, and/or reoriented, as desired, and the label or annotation can follow the object 408. Further, the approach of decoupling foreground objects from the map can make it easier to generate training data for new background scenes and/or new objects. For example, to train the model for a new city, a map can be generated for the new city, and then foreground objects can be inserted into the map, at desired positions and orientations. The decoupled approach is more flexible and efficient than previous approaches in which complete scenes are scanned all at once, and the arrangement of objects is limited to how events unfolded in the real world.

Advantageously, the artificially real training datasets described herein can be generated from lidar data (e.g., 3D maps) obtained with real or physical lidar sensors. Because the point cloud data for the background and the objects (e.g., static objects, dynamic objects, and foreground objects) is obtained from a physical lidar sensor, sensor noise and object reflectance may be captured by or represented in the point cloud data. This results in more accurate training data and, once trained, more accurate ML models. In general, point cloud data for the background scene and foreground objects can be blended in various permutations and combinations, some of which may be difficult or impractical to encounter in a physical situation.

Figure 4B:
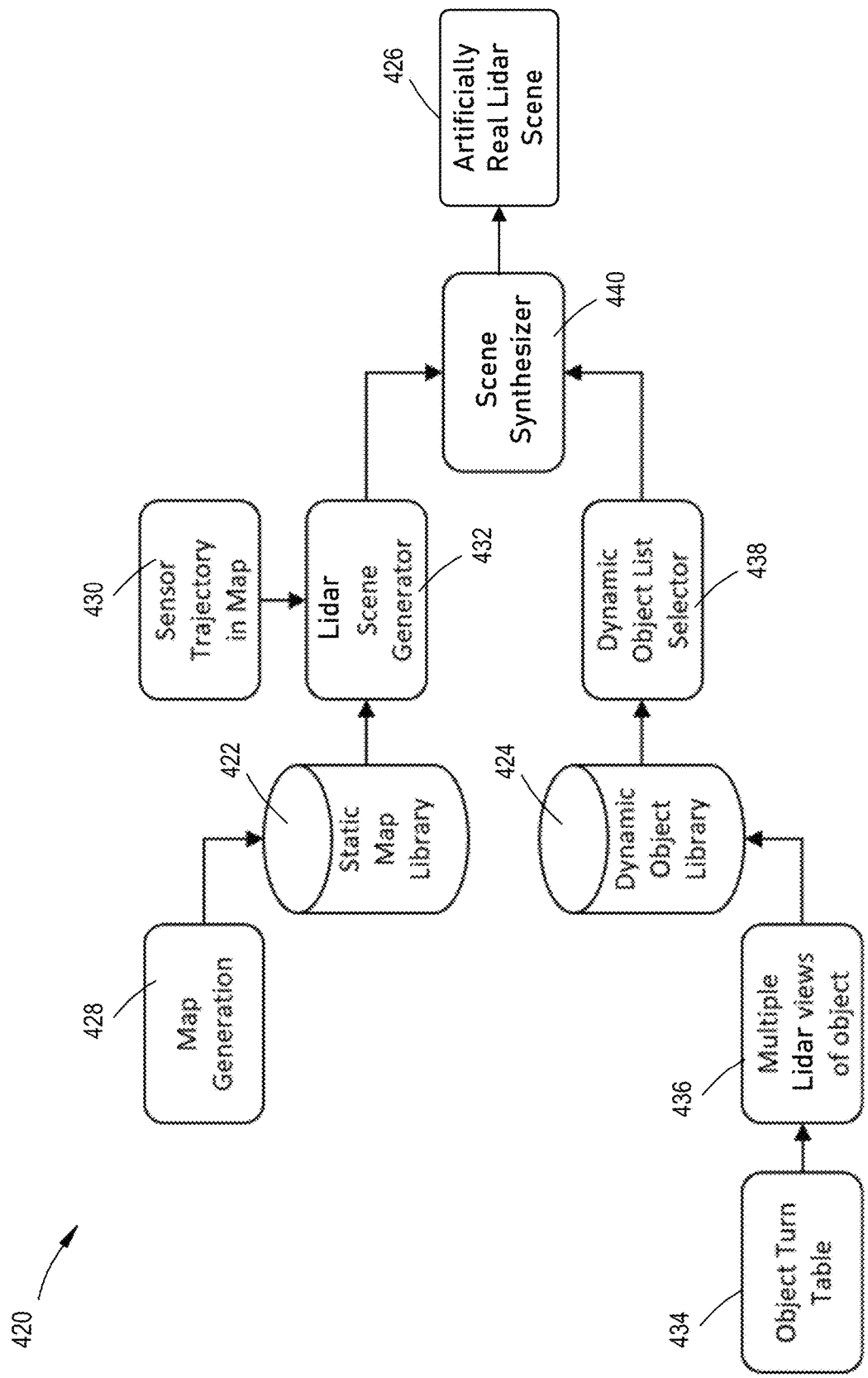
FIG. 4B is a schematic diagram of a process for generating lidar scenes from point cloud data obtained from a physical lidar sensor, in accordance with some embodiments.

FIG. 4B illustrates an example method 420 in which a lidar scene generator 432, a dynamic object list selector 438, and a scene synthesizer 440 are used to generate an artificially real lidar scene 426 (alternatively referred to as an artificially real lidar dataset). In various examples, the scene generation process can include: (1) creating a static map library 422 of background scenes; (2) creating a dynamic object library 424 of dynamic objects; and (3) synthesizing various combinations and permutations of background scenes and dynamic objects to create multiple artificially real lidar scenes 426. The background scenes, dynamic objects, and artificially real lidar scenes 426 can include or be defined by point cloud data obtained from one or more physical lidar sensors. One or more steps of the method 420 can be performed by the control & data acquisition module 108 and/or the data analysis & interpretation module 109, described above.

In some examples, to create the static map library 422, background scenes can be scanned using one or more physical lidar sensors, and data from the scan can be processed by a lidar system to generate maps 428 of the background scenes. Each map in the static map library 422 can be or include a point cloud representation of a background scene. The point cloud representation can have a high density (e.g., about 10,000 points per square meter) and/or can include points located at a variety of angles and distances with respect to the lidar sensor. Each point in the point cloud can represent a point on a surface of an object in a background scene. The dense point cloud for a map can be generated while a lidar sensor is traveling through the background scene, such that point cloud data can be collected from multiple sensor positions.

The maps in the static map library 422 can represent lidar scans for a variety of background scenes (e.g., roads, cities, rural areas, etc.). In some examples, a static map (alternatively referred to herein as a "map") can include a background scene with one or more static objects but no dynamic objects (e.g., foreground objects). To generate a map, a lidar sensor on a vehicle may be used to sweep the same area more than once, and differences between the scans can be used to identify any moving or dynamic objects, which can be removed to obtain an empty background scene. The generated maps, stored in the static map library 422, can be used as starting points (e.g., static, background scenes) for constructing artificially real lidar scenes 426. In various instances, for example, a static map or background scene of point cloud data can be used to generate a variety of artificially real lidar scenes in which point cloud data for one or more dynamic objects (e.g., a car, a pedestrian, etc.) are placed in one or more locations of the scene. The artificial scenes generated in this matter can be used to train one or more lidar-based ML models, as described herein.

Figure 4C:
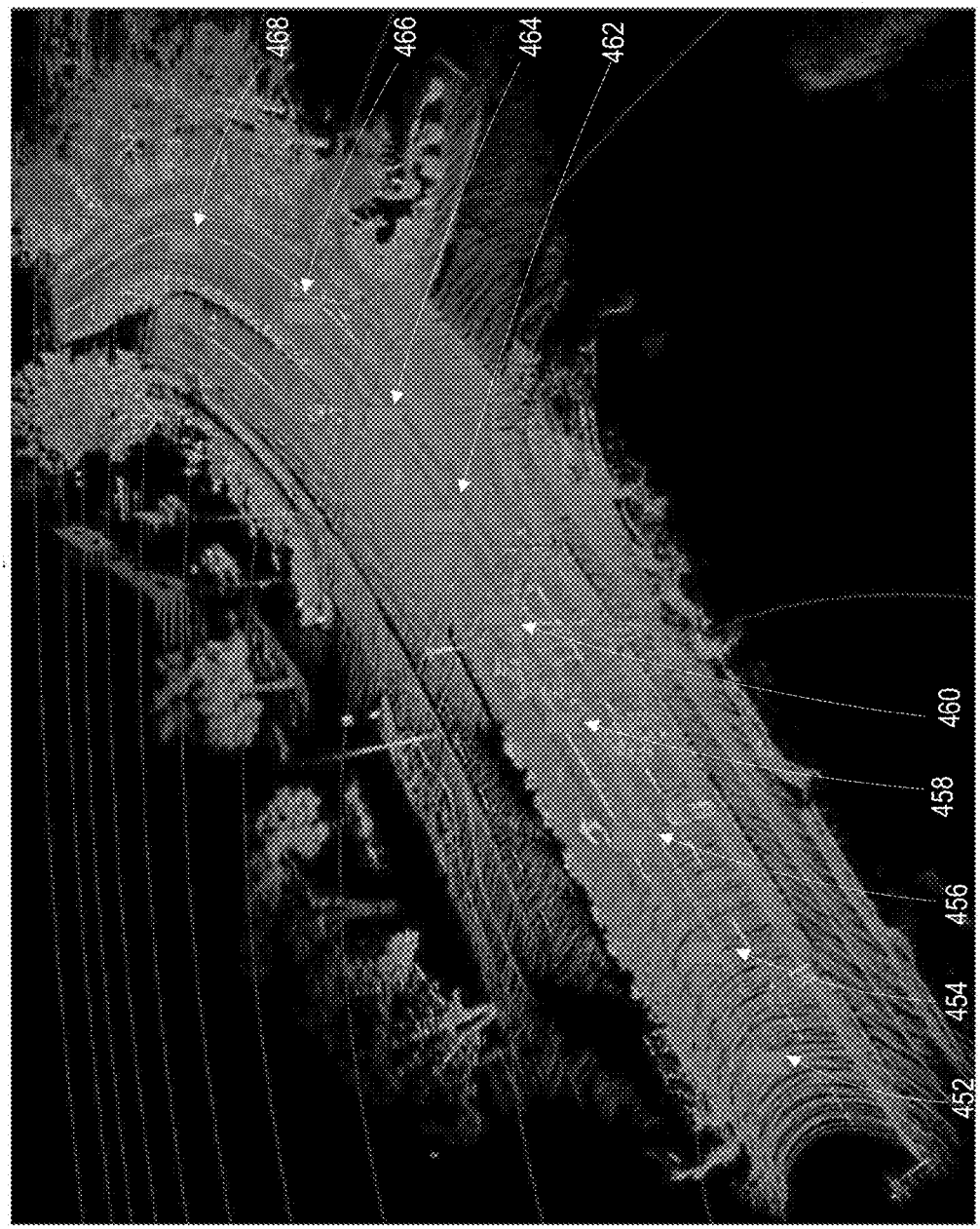
FIG. 4C is an image of a lidar sensor trajectory in a lidar point cloud for a background scene, in accordance with some embodiments.

In various examples, an artificial scene can be constructed that includes point cloud representations of a background (e.g., with static objects) and foreground objects (e.g., dynamic objects) and includes a sensor trajectory 430 defining one or more locations where a lidar sensor may be deployed in the scene. For example, FIG. 4C depicts an artificial scene 450 in which a sensor trajectory 430 is defined by or includes checkpoints 452 through 468 representing lidar sensor locations for the scene 450. The sensor trajectory 430 and checkpoints 452 through 468 may be chosen to represent desired lidar scan locations for the scene 450. For example, the number and/or locations of the checkpoints in the sensor trajectory 430 may be chosen based on the type of scene 450. In some examples, more checkpoints (or a higher density of checkpoints) may be needed in regions having many foreground objects (e.g., crowded traffic intersections) than in regions having few or no foreground objects (e.g., remote roads). Additionally or alternatively, the sensor trajectory 430 and checkpoints may be chosen based on a high variability of the scenes (e.g., wide variations in foreground object densities and types) and/or on lidar sensor parameters, such as distance requirements or ranges. With the lidar sensor locations defined, as indicated by checkpoints in the sensor trajectory 430, one or more dynamic objects can be placed in the scene 450 so that ML models can be trained to recognize the objects from the perspective of each checkpoint location.

In some instances, ML models can be trained to recognize objects as they may appear to a lidar sensor traveling at a specified velocity from one checkpoint to the next along the sensor trajectory 430. By presenting the ML models with a sequence of point cloud data from the perspective of each checkpoint location, the ML models can learn to recognize objects and make decisions based on how the objects may be presented to the models in real time (e.g., as a vehicle is traveling down the road). This can allow the ML models to consider velocity differences (e.g., relative velocities), changes in orientation and/or position, etc., between the vehicle or lidar sensor and one or more objects in the point cloud. For example, the ML model can learn to recognize when an object is moving towards or into a path of a vehicle, such that corrective action may be necessary to avoid a collision.

In various implementations, the placement of the dynamic objects in the scene 450 may be based on the sensor trajectory 430, distances and angles with respect to the checkpoint locations, and/or other requirements. For example, the dynamic objects may be placed in realistic locations within the scene, according to the positions of background objects, such as sidewalks, driveways, intersections, crosswalks, etc. Referring again to FIG. 4B, the lidar scene generator 432 can be used to create the map (e.g., the scene 450) having the empty background and the sensor trajectory 430, including one or more checkpoints.

There are several advantages associated with building the static map library 422 of background scenes. For example, point cloud data for the background scenes can be captured (e.g., automatically) using a lidar sensor on a vehicle in a short span of time (e.g., less than a few seconds or minutes). Because the point cloud data is obtained for a physical environment using a physical lidar sensor, there may be no need to generate point cloud data through simulations involving a virtual environment with simulated surface geometries and reflectance. Use of a physical environment and a physical lidar sensor can allow the signal-to-noise ratio (SNR) of lidar sensors to be captured in the maps. By comparison, the sensor SNR, surface geometries, and surface reflectance can be difficult to model when generating point cloud data in simulators.

In some examples, the maps can be used to generate training datasets for lidar sensors that are different from the lidar sensors used to capture the map data. For example, a dense point cloud map of an environment can look the same regardless of the sensor type or model used to generate the map. Accordingly, to extract point cloud data from the map for a specific sensor model, a virtual representation of the sensor can be placed into the map at a desired location (e.g., at a checkpoint in a trajectory), and beam locations can be predicted for the sensor (e.g., based on a sweeping pattern and/or transmitter orientations for the sensor). Data points can then be extracted from the map that resemble the sensor's view of the map. This can involve, for example, determining where the predicted beam locations intersect the dense point cloud and identifying and extracting data points in the map that correspond to or are closest to the intersection locations. In some instances, for example, a dense point cloud map can be built with a first type of sensor, and then a virtual representation of a second type of sensor (e.g., a different sensor model) can be placed into the map (e.g., at a checkpoint). Data points can then be extracted from the map using the sweeping pattern and laser configuration of the second type of sensor, and the extracted points can represent a scan that would be obtained using the second type of sensor. This allows a map generated using one type of sensor to be used to generate point cloud data for a different type of sensor.

Still referring to FIG. 4B, in addition to creating the maps for the static map library 422 and the sensor trajectories, the method 420 can involve creating point cloud representations of dynamic objects for storage in a dynamic object library 424. The dynamic objects can be or include, for examples, cars, bicycles, pedestrians, buses, or other objects that can be generally compact. In various examples, point cloud data for dynamic objects can be obtained by scanning the dynamic objects using a physical lidar sensor. The dynamic objects can be scanned at a variety of orientations and angles with respect to the physical lidar sensors. This allows point cloud representations for a dynamic object to be obtained for various angles and orientations of the dynamic object. Such scans can capture in-class variations (e.g., different car models, pedestrian poses, pedestrian sizes, etc.) and/or true reflectance characteristics for the dynamic objects. In some examples, a large object turntable 434 can be used to scan the dynamic objects. A dynamic object can be placed on the turntable 434 and scanned by one or more lidar sensors at a variety of viewpoints, angles, and/or distances, to obtain multiple views 436 or point cloud representations for the object, from the perspective of the lidar sensor(s).

Figure 4D:
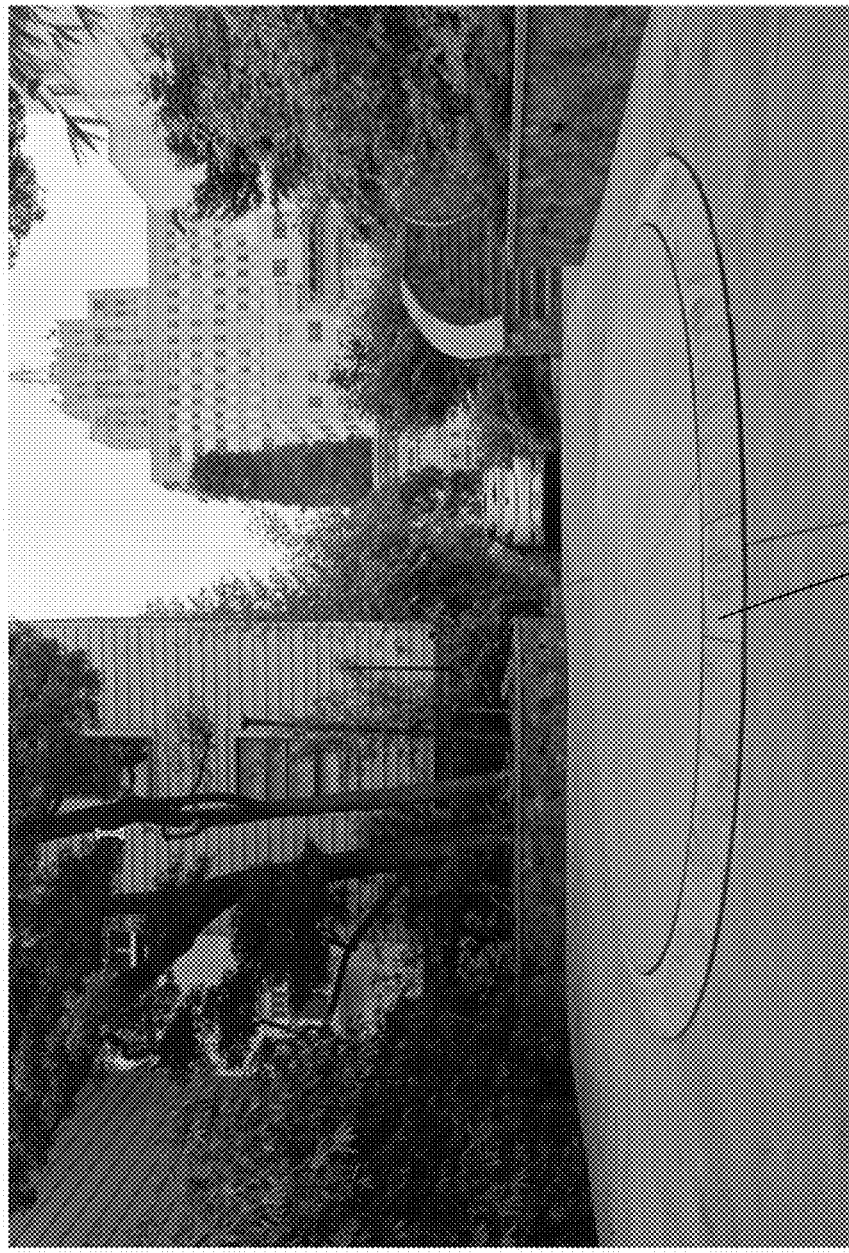
FIG. 4D is a photograph of a turntable for performing a lidar scan of an object in a city environment, in accordance with some embodiments.
Figure 4E:
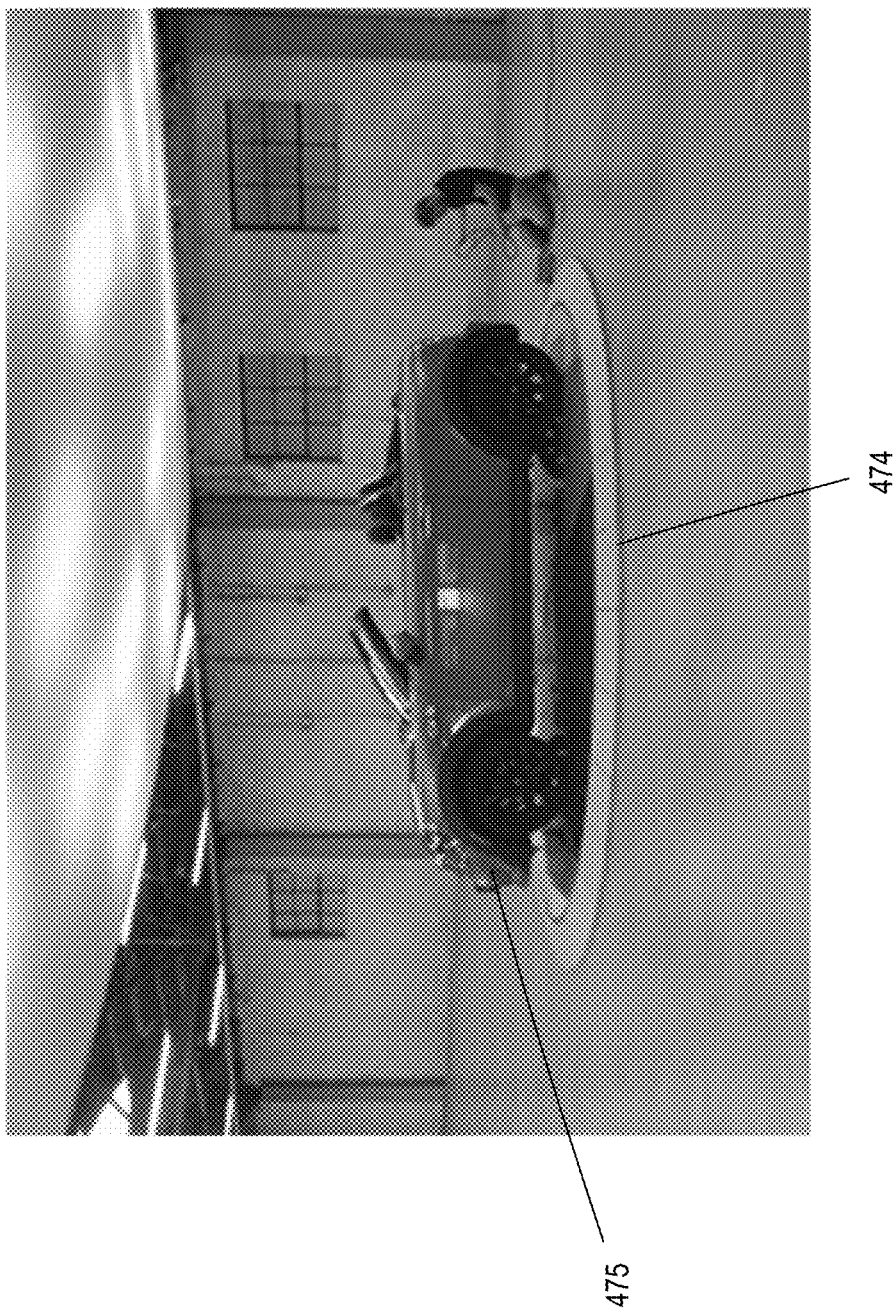
FIG. 4E is a photograph of a turntable for performing a lidar scan of a car or other object in an indoor environment, in accordance with some embodiments.

Example turntables 472 and 474 are shown in FIGS. 4D and 4E, respectively. The turntables 472 and 474 can be installed indoors or outdoors and used to rotate dynamic objects to desired orientations when performing lidar scans of the objects. For example, a car 475 or other dynamic object can be parked on the turntable 474 and rotated so that point cloud data for the car 475 can be collected from one or more lidar sensors at various distances and/or angles.

Figure 4F:
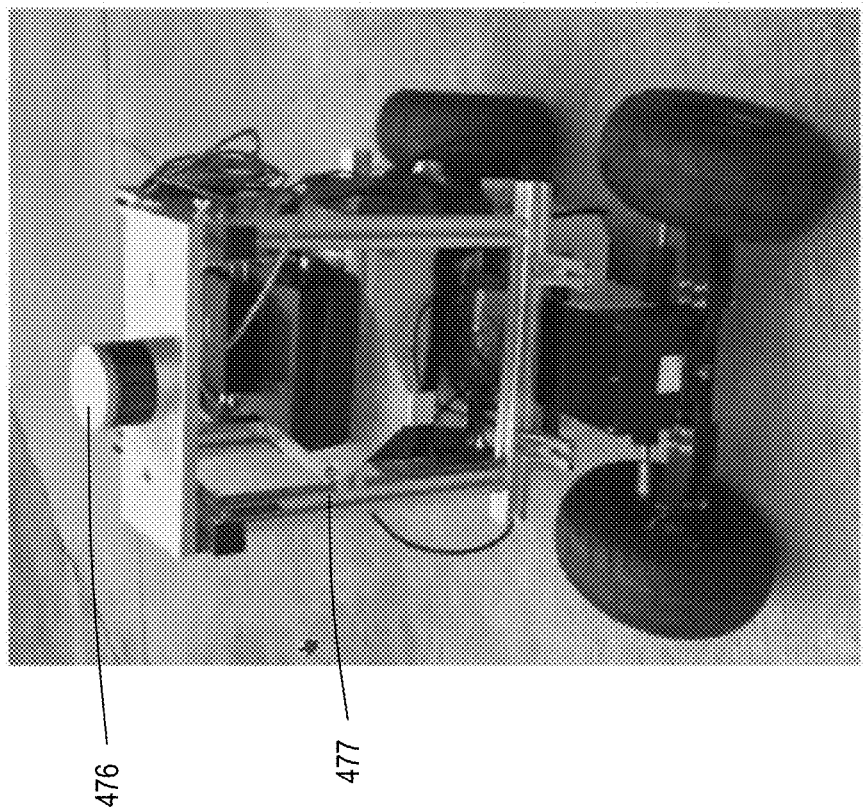
FIG. 4F is a photograph of a lidar sensor on a robot, in accordance with some embodiments.

Referring to FIG. 4F, a lidar sensor 476 can be placed on a robot 477 that can move the lidar sensor 476 to a desired location and/or orientation with respect to the object being scanned. The lidar sensor 476 may be positioned at different distances and/or different angles to collect multi-view data of the object (e.g., the car 475). The scan performed by the lidar sensor 476 may capture geometric aspects of the object (e.g., shape and size) rather than or in addition to color or other attributes of the object.

Referring again to FIG. 4B, there are several advantages to build the dynamic object library 424. For example, the dynamic object library 424 can store lidar point cloud data for dynamic objects at various viewpoints and distances with respect to one or more lidar sensors. Also, since parameters for the objects, turntables, and the lidar sensors are known, training data for the objects (e.g., point cloud data) can be more easily annotated, either manually or automatically. Moreover, the dynamic object library 424 enables a lidar-based ML model to be exposed to lidar data for new dynamic objects, without having to search for and scan the objects in real-world environments (e.g., waiting for a type of car to appear on the road). In general, the dynamic object library 424 facilitates the creation, storage, and retrieval of lidar point cloud data for training one or more lidar-based ML models.

In some embodiments, data stored in the dynamic object library 424 for dynamic objects can include various annotations or labels, such as, for example: one or more bounding boxes (e.g., cubic or rectangular boxes) surrounding an object; a label (e.g., a name) identifying an object; an indication of a type of view of an object (e.g., front view, back view, side view, etc.) during a scan; an indication of a distance between a lidar sensor and an object during a scan; an indication of a type of relative motion between the object and the sensor during a scan, etc. An object list selector 438 may be provided for selecting objects from the dynamic object library 424. For example, a user can use the object list selector 438 to locate scan data for an object in a particular orientation and/or distance with respect to a lidar sensor.

Still referring to FIG. 4B, the method 420 utilizes the scene synthesizer 440 to generate artificially real lidar scenes 426. For example, the scene synthesizer 440 can receive as input a lidar scene from the lidar scene generator 432. The lidar scene can include a point cloud representation of a background scene from the static map library 422. Additionally or alternatively, the lidar scene can include a sensor trajectory 430 that defines one or more locations (e.g., virtual locations) for a lidar sensor within the lidar scene. The scene synthesizer 440 can also receive as input point cloud representations of one or more dynamic objects, which can be obtained from the dynamic object library 424 using the dynamic object list selector 438. The scene synthesizer 440 can be used to place the one or more dynamic objects within the lidar scene at desired positions and orientations. For example, the scene synthesizer 440 can place point cloud representations of one or more cars, pedestrians, or other objects into a point cloud representation of the lidar scene. Such placements can be made manually and/or automatically. For example, the scene synthesizer 440 can place cars, pedestrians, or other objects into the lidar scene in positions and/or orientations at which the objects would likely be encountered in real-world situations. For example, pedestrians can be placed on sidewalks or crosswalks, and cars can be placed in proper lanes within roads. Additionally or alternatively, to provide robust training for lidar-based ML models, scenes can be created that are rare or unlikely to be encountered in real-world situations. For example, a car can be placed sideways in the middle of a lane, a pedestrian can be placed in the middle of a highway, etc.

In various examples, the scene generator 432 and the scene synthesizer 440 can use simulation techniques to generate artificially real lidar scenes 426 from the point cloud data for the background scene and objects. To achieve this, the lidar scene generator 432 may first generate a static scene from the point cloud map for the background scene. The scene generator 432 can project rays or laser beams from a virtual lidar sensor location in map. The scene generator 432 can determine where the rays intersect static object surfaces and can choose point cloud locations that are closest to the determined intersection locations. The scene generator 432 can recognize shadows cast by one or more static objects. For example, a pole between the sensor and the building can cast a shadow onto the building. The shadow may or may not be present or visible in the map, but the scene generator 432 can recognize the existence of the shadow from the perspective of the sensor.

Once the static scene has been generated by the scene generator 432, the static scene may be augmented with dynamic objects using the scene synthesizer 440. The scene synthesizer 440 may receive the static scene from the scene generator 432 and a list of dynamic objects from the dynamic object list selector 438. The scene synthesizer 440 can then drop dynamic objects at desired locations in the static scene. In various examples, the scene synthesizer 440 can calculate shadows that dynamic objects cast on the static objects. For example, a pedestrian (a dynamic object) between the sensor and a building (a static object) can cast a shadow onto the building. The scene synthesizer 440 can remove or ignore point cloud data in shadows or in locations that are otherwise not visible from a current position or checkpoint of the lidar sensor. Advantageously, the artificially real lidar scenes 426 improve training accuracy by capturing sensor signal-to-noise ratios, surface geometries, and surface reflectivity associated with physical lidar sensors in physical environments.

Figure 4G:
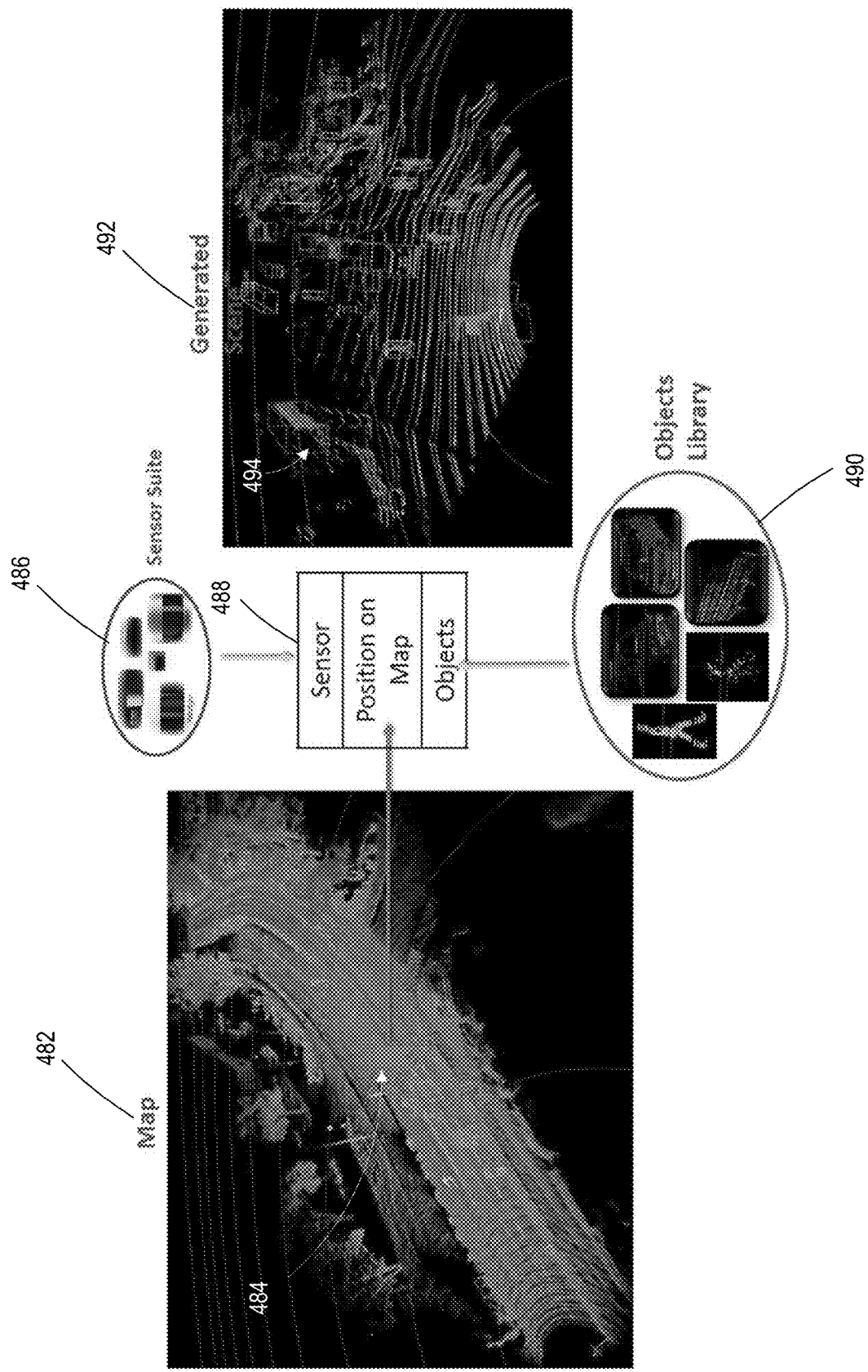
FIG. 4G is a schematic diagram of a process for generating lidar scenes from point cloud data obtained from a physical lidar sensor, in accordance with some embodiments.

FIG. 4G illustrates an example artificially real lidar scene 492 generated from a background scene 482 (e.g., from the static map library 422), one or more dynamic objects 490 (e.g., from the dynamic object library 424), and information 488 for one or more lidar sensors 486 (e.g., sensor type and sensor location), as described herein. The information 488 for the one or more lidar sensors 486 can include, for example, a sensor type (e.g., sensor model or product name) and/or a position or checkpoint 484 for a sensor within the background scene 482. The artificially real lidar scene 492 can include annotations for the dynamic objects 494 that have been placed in the artificially real lidar scene 492. The artificially real lidar scene 492 can be used to train one or more lidar-based ML models, as described herein.

Figure 5:
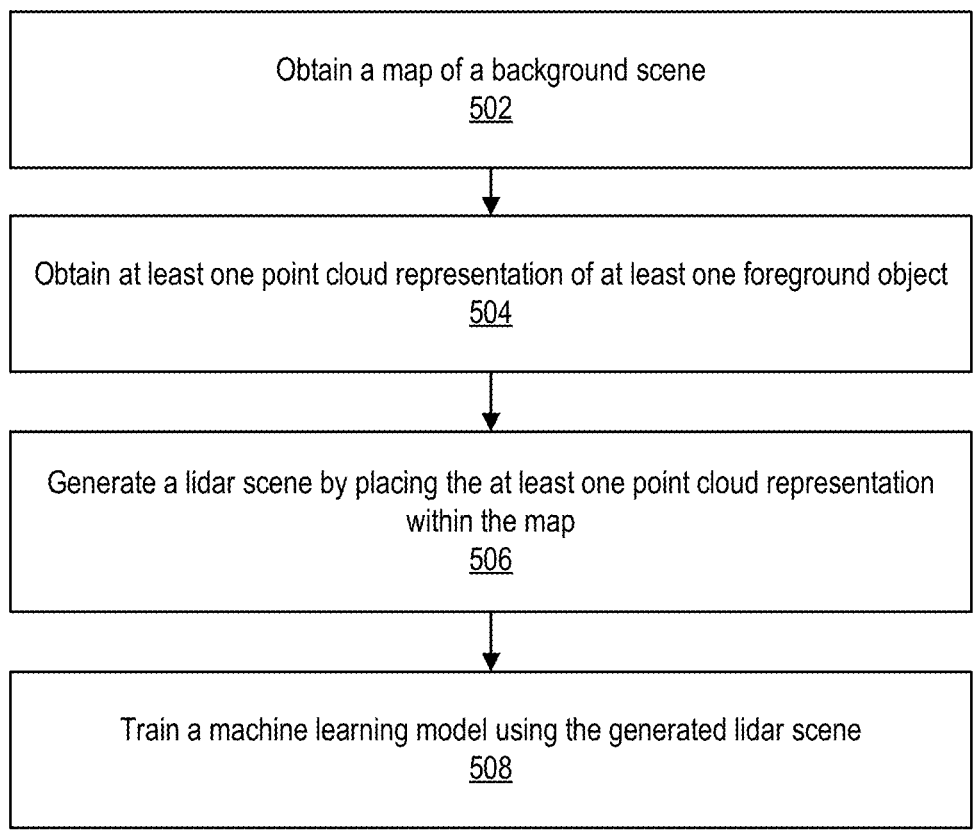
FIG. 5 is a flowchart of a process for training a lidar-based machine learning model, in accordance with some embodiments.

FIG. 5 shows a flowchart of method 500 for training a lidar-based machine learning model, in accordance with some embodiments. A map of a background scene is obtained at step 502. The map includes 3D point cloud data generated using one or more lidar sensors. The background scene can include or represent, for example, a residential area, a downtown area, a highway, a road, a sidewalk, a city, natural features, natural terrain, or any combination thereof. In some embodiments, the map of the background scene can be obtained by performing one or more scans of the background scene using the one or more lidar sensors, identifying a dynamic object in the one or more scans, and removing the dynamic object from the one or more scans.

At step 504, at least one point cloud representation of at least one foreground object is obtained. The at least one point cloud representation can include 3D point cloud data generated using one or more lidar sensors for the at least one foreground object. The one or more lidar sensors used for step 504 can be the same as or different from the one or more lidar sensors used for step 502. The foreground object can include or represent, for example, a car, a bus, a motorcycle, a bicycle, a vehicle, a pedestrian, a person, an animal, or any combination thereof. In some embodiments, the at least one point cloud representation can be retrieved from a library of point cloud representations for a number of foreground objects.

At step 506, a lidar scene is generated by placing the at least one point cloud representation within the map. A sensor trajectory defining one or more locations (e.g., virtual locations) for a lidar sensor within the lidar scene can be used to generate the lidar scene.

At step 508, a machine learning model is trained using the generated lidar scene. The machine learning model can be trained to identify objects (e.g., roads, vehicles, pedestrians, trees, etc.) in an environment being sensed by the one or more lidar sensors. Based on the identified objects, the machine learning model can provide instructions to a vehicle for navigating the environment.

In certain examples, the machine learning model training techniques described herein can be used for radio detection and ranging (RADAR) devices in addition to or instead of lidar devices. For example, a machine learning model can be trained based on a background map and foreground objects generated using one or more RADAR sensors. The background map can be obtained by performing one or more scans of a background scene using the one or more RADAR sensors (e.g., to generate a RADAR point cloud of the background scene). One or more dynamic objects can be identified in the background scene scan data and removed, if desired. Foreground objects can be scanned using the one or more RADAR sensors (e.g., to generate RADAR point cloud data for the foreground objects). Training data can be generated by placing RADAR scan data for one or more foreground objects in the RADAR scan data for the background map, and the machine learning model can be trained using the training data. Alternatively or additionally, the machine learning model can be trained with a combination of RADAR scan data and lidar point cloud data. The trained machine learning model can be used to identify objects in an environment sensed by one or more RADAR sensors and/or lidar sensors. For example, a vehicle can have a RADAR sensor and/or a lidar sensor that generate scan data for a surrounding environment. The resulting scan data can be provided to the trained machine learning model, and the machine learning model can be used to identify objects in the surrounding environment. The object identifications from the machine learning model can be used by a vehicle control system to control the vehicle.

Some Examples of Continuous Wave (CW) Lidar Systems

As discussed above, some lidar systems may use a continuous wave (CW) laser to detect the range and/or velocity of targets, rather than pulsed TOF techniques. Such systems include continuous wave (CW) coherent lidar systems and frequency modulated continuous wave (FMCW) coherent lidar systems. For example, any of the lidar systems 100, 202, 250, and 270 described above can be configured to operate as a CW coherent lidar system or an FMCW coherent lidar system.

Lidar systems configured to operate as CW or FMCW systems can avoid the eye safety hazards commonly associated with pulsed lidar systems (e.g., hazards that arise from transmitting optical signals with high peak power). In addition, coherent detection may be more sensitive than direct detection and can offer better performance, including single-pulse velocity measurement and immunity to interference from solar glare and other light sources, including other lidar systems and devices.

Figure 6:
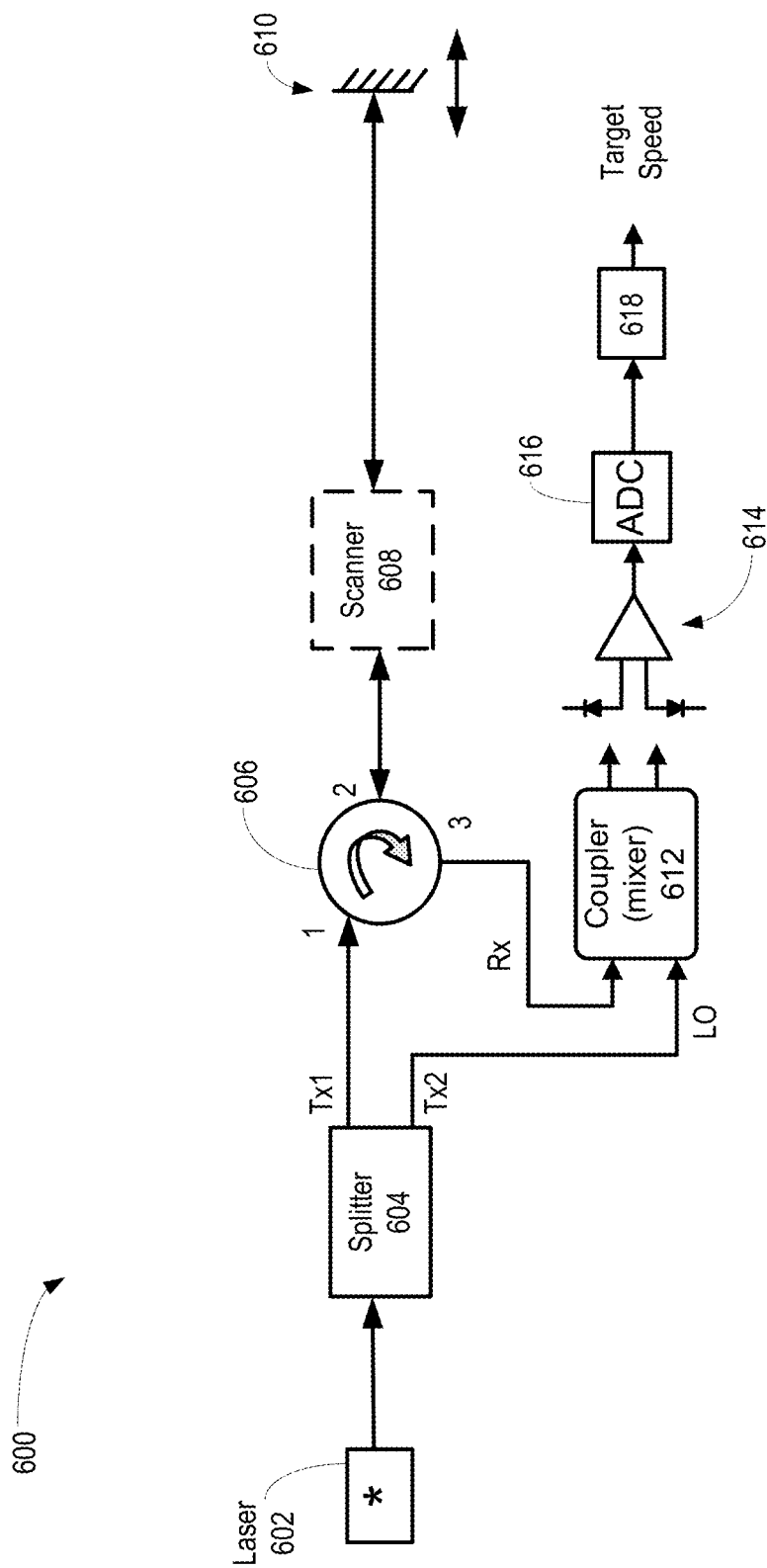
FIG. 6 is an illustration of an example continuous wave (CW) coherent lidar system, in accordance with some embodiments.

FIG. 6 illustrates an exemplary CW coherent lidar system 600 configured to determine the radial velocity (or speed) of a target. Lidar system 600 includes a laser 602 configured to produce a laser signal which is provided to a splitter 604. The laser 602 may provide a laser signal having a substantially constant laser frequency.

In one example, the splitter 604 provides a first split laser signal Tx1 to a direction selective device 606, which provides (e.g., forwards) the signal Tx1 to a scanner 608. In some examples, the direction selective device 606 is a circulator. The scanner 608 uses the first laser signal Tx1 to transmit light emitted by the laser 602 and receives light reflected by the target 610 (e.g., "reflected light" or "reflections"). The reflected light signal Rx is provided (e.g., passed back) to the direction selective device 606. The second laser signal Tx2 (provided by the splitter 604) and the reflected light signal Rx are provided to a coupler (also referred to as a mixer) 612. The mixer may use the second laser signal Tx2 as a local oscillator (LO) signal and mix it with the reflected light signal Rx. The mixer 612 may be configured to mix the reflected light signal Rx with the local oscillator signal LO. The mixer 612 may provide the mixed optical signal to differential photodetector 614, which may generate an electrical signal representing the beat frequency $f_{beat}$ of the mixed optical signals, where $f_{beat}=|f_{Tx2}-f_{Rx}|$ (the absolute value of the difference between the frequencies of the mixed optical signals). In some embodiments, the current produced by the differential photodetector 614 based on the mixed light may have the same frequency as the beat frequency $f_{beat}$. The current may be converted to a voltage by an amplifier (e.g., a transimpedance amplifier (TIA)), which may be provided (e.g., fed) to an analog-to-digital converter (ADC) 616 configured to convert the analog voltage signal to digital samples for a target detection module 618. The target detection module 618 may be configured to determine (e.g., calculate) the radial velocity of the target 610 based on the digital sampled signal with the beat frequency $f_{beat}$.

In one example, the target detection module 618 may identify Doppler frequency shifts using the beat frequency $f_{beat}$ and determine the radial velocity of the target 610 based on those shifts. For example, the radial velocity of the target 610 can be calculated using the following relationship:

$$f_d = \frac{2}{\lambda} v_t$$

where, $f_d$ is the Doppler frequency shift, $\lambda$ is the wavelength of the laser signal, and $v_t$ is the radial velocity of the target 610. In some examples, the direction of the target 610 is indicated by the sign of the Doppler frequency shift $f_d$. For example, a positive signed Doppler frequency shift may indicate that the target 610 is traveling towards the system 600 and a negative signed Doppler frequency shift may indicate that the target 610 is traveling away from the system 600.

In one example, a Fourier Transform calculation is performed using the digital samples from the ADC 616 to recover the desired frequency content (e.g., the Doppler frequency shift) from the digital sampled signal. For example, a controller (e.g., target detection module 618) may be configured to perform a Discrete Fourier Transform (DFT) on the digital samples. In certain examples, a Fast Fourier Transform (FFT) can be used to calculate the DFT on the digital samples. In some examples, the Fourier Transform calculation (e.g., DFT) can be performed iteratively on different groups of digital samples to generate a target point cloud.

While the lidar system 600 is described above as being configured to determine the radial velocity of a target, it should be appreciated that the system can be configured to determine the range and/or radial velocity of a target. For example, the lidar system 600 can be modified to use laser chirps to detect the velocity and/or range of a target.

Some examples have been described in which a DFT is used to generate points of a point cloud based on a group of samples. However, frequency analysis techniques (e.g., spectrum analysis techniques) other than the DFT may be used to generate points of a point cloud based on a group of samples. Any suitable frequency analysis technique may be used, including, without limitation, Discrete Cosine transform (DCT), Wavelet transform, Auto-Regressive moving average (ARMA), etc.

Figure 7:
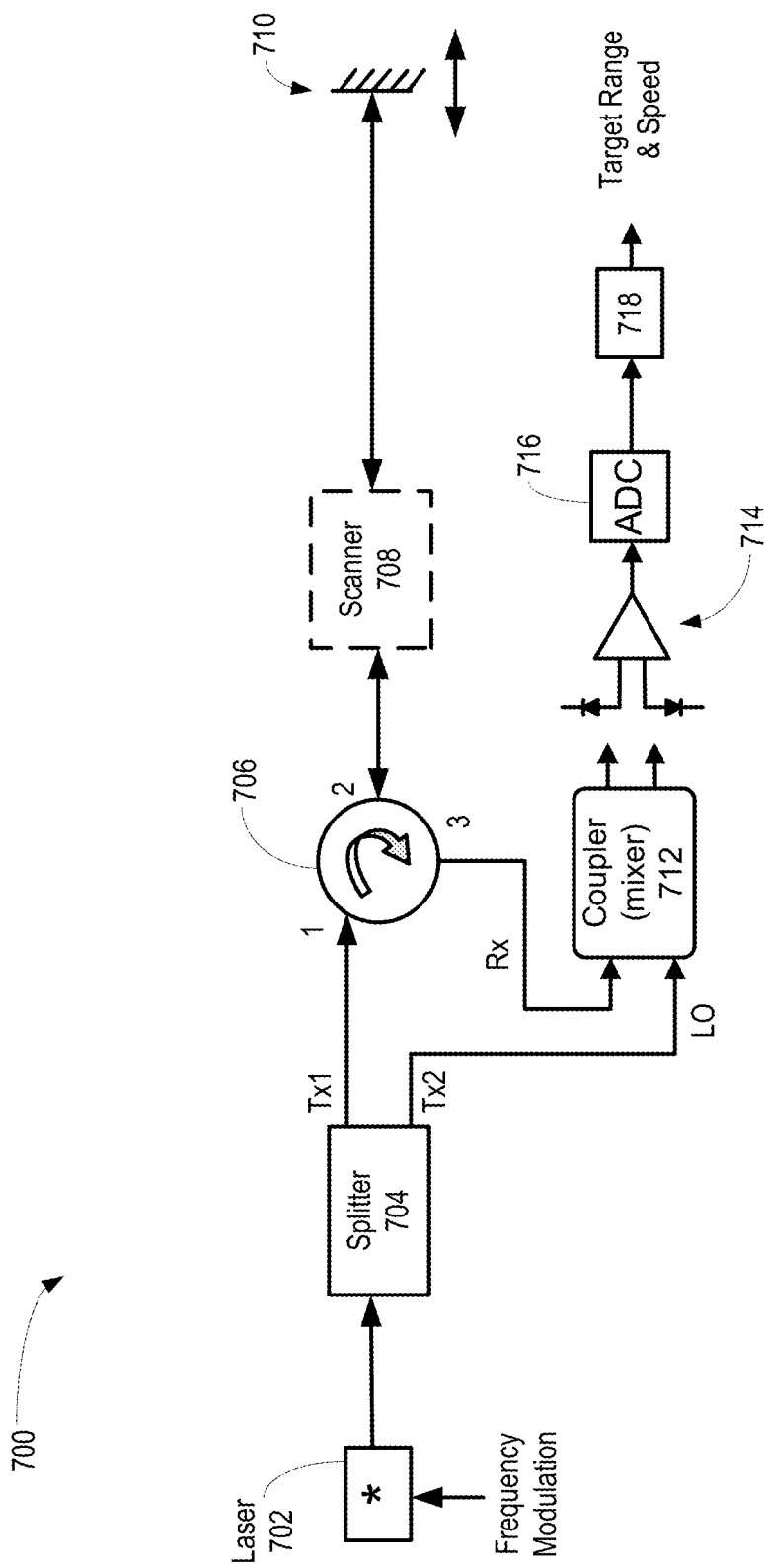
FIG. 7 is an illustration of an example frequency modulated continuous wave (FMCW) coherent lidar system, in accordance with some embodiments.

FIG. 7 illustrates an exemplary FMCW coherent lidar system 700 configured to determine the range and/or radial velocity of a target. Lidar system 700 includes a laser 702 configured to produce a laser signal which is fed into a splitter 704. The laser is "chirped" (e.g., the center frequency of the emitted laser beam is increased ("ramped up" or "chirped up") or decreased ("ramped down" or "chirped down") over time (or, equivalently, the central wavelength of the emitted laser beam changes with time within a waveband). In various embodiments, the laser frequency is chirped quickly such that multiple phase angles are attained. In one example, the frequency of the laser signal is modulated by changing the laser operating parameters (e.g., current/voltage) or using a modulator included in the laser source 702; however, in other examples, an external modulator can be placed between the laser source 702 and the splitter 704.

In other examples, the laser frequency can be "chirped" by modulating the phase of the laser signal (or light) produced by the laser 702. In one example, the phase of the laser signal is modulated using an external modulator placed between the laser source 702 and the splitter 704; however, in some examples, the laser source 702 may be modulated directly by changing operating parameters (e.g., current/voltage) or may include an internal modulator. Similar to frequency chirping, the phase of the laser signal can be increased ("ramped up") or decreased ("ramped down") over time.

Some examples of systems with FMCW-based lidar sensors have been described. However, some embodiments of the techniques described herein may be implemented using any suitable type of lidar sensors including, without limitation, any suitable type of coherent lidar sensors (e.g., phase-modulated coherent lidar sensors). With phase-modulated coherent lidar sensors, rather than chirping the frequency of the light produced by the laser (as described above with reference to FMCW techniques), the lidar system may use a phase modulator placed between the laser 702 and the splitter 704 to generate a discrete phase modulated signal, which may be used to measure range and radial velocity.

As shown, the splitter 704 provides a first split laser signal Tx1 to a direction selective device 706, which provides (e.g., forwards) the signal Tx1 to a scanner 708. The scanner 708 uses the first laser signal Tx1 to transmit light emitted by the laser 702 and receives light reflected by the target 710. The reflected light signal Rx is provided (e.g., passed back) to the direction selective device 706. The second laser signal Tx2 and reflected light signal Rx are provided to a coupler (also referred to as a mixer) 712. The mixer may use the second laser signal Tx2 as a local oscillator (LO) signal and mix it with the reflected light signal Rx. The mixer 712 may be configured to mix the reflected light signal Rx with the local oscillator signal LO to generate a beat frequency $f_{beat}$. The mixed signal with beat frequency $f_{beat}$ may be provided to a differential photodetector 714 configured to produce a current based on the received light. The current may be converted to voltage by an amplifier (e.g., a transimpedance amplifier (TIA)), which may be provided (e.g., fed) to an analog-to-digital converter (ADC) 716 configured to convert the analog voltage to digital samples for a target detection module 718. The target detection module 718 may be configured to determine (e.g., calculate) the range and/or radial velocity of the target 710 based on the digital sample signal with beat frequency $f_{beat}$.

Laser chirping may be beneficial for range (distance) measurements of the target. In comparison, Doppler frequency measurements are generally used to measure target velocity. Resolution of distance can depend on the bandwidth size of the chirp frequency band such that greater bandwidth corresponds to finer resolution, according to the following relationships:

$$\text{Range resolution: } \Delta R = \frac{c}{2BW} \text{ (given a perfectly linear chirp), and}$$

$$\text{Range: } R = \frac{f_{beat} \cdot c \cdot T_{ChirpRamp}}{2 \cdot BW}$$

where c is the speed of light, BW is the bandwidth of the chirped laser signal, $f_{beat}$ is the beat frequency, and $T_{ChirpRamp}$ is the time period during which the frequency of the chirped laser ramps up (e.g., the time period corresponding to the up-ramp portion of the chirped laser). For example, for a distance resolution of 3.0 cm, a frequency bandwidth of 5.0 GHz may be used. A linear chirp can be an effective way to measure range and range accuracy can depend on the chirp linearity. In some instances, when chirping is used to measure target range, there may be range and velocity ambiguity. In particular, the reflected signal for measuring velocity (e.g., via Doppler) may affect the measurement of range. Therefore, some exemplary FMCW coherent lidar systems may rely on two measurements having different slopes (e.g., negative and positive slopes) to remove this ambiguity. The two measurements having different slopes may also be used to determine range and velocity measurements simultaneously.

Figures 8A, 8B:
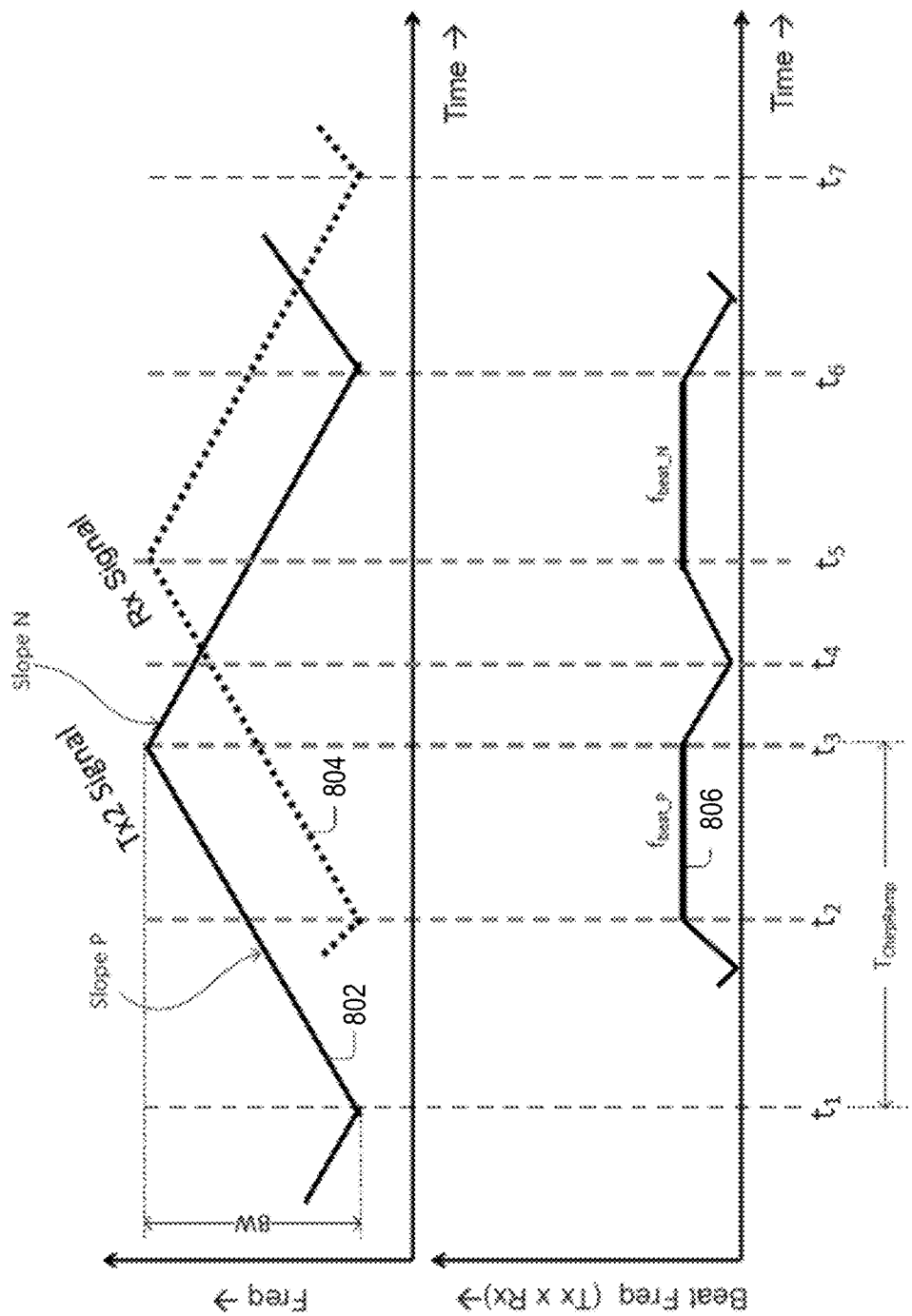
FIG. 8A is a plot of a frequency chirp as a function of time in a transmitted laser signal and reflected signal, in accordance with some embodiments.
FIG. 8B is a plot illustrating a beat frequency of a mixed signal, in accordance with some embodiments.

FIG. 8A is a plot of ideal (or desired) frequency chirp as a function of time in the transmitted laser signal Tx (e.g., signal Tx2), depicted in solid line 802, and reflected light signal Rx, depicted in dotted line 804. As depicted, the ideal Tx signal has a positive linear slope between time t1 and time t3 and a negative linear slope between time t3 and time t6. Accordingly, the ideal reflected light signal Rx returned with a time delay td of approximately t2–t1 has a positive linear slope between time t2 and time t5 and a negative linear slope between time t5 and time t7.

FIG. 8B is a plot illustrating the corresponding ideal beat frequency $f_{beat}$ 806 of the mixed signal Tx2×Rx. Note that the beat frequency $f_{beat}$ 806 has a constant value between time t2 and time t3 (corresponding to the overlapping up-slopes of signals Tx2 and Rx) and between time t5 and time t6 (corresponding to the overlapping down-slopes of signals Tx2 and Rx).

The positive slope ("Slope P") and the negative slope ("Slope N") (also referred to as positive ramp (or up-ramp) and negative ramp (or down-ramp), respectively) can be used to determine range and/or velocity. In some instances, referring to FIGS. 8A-8B, when the positive and negative ramp pair is used to measure range and velocity simultaneously, the following relationships are utilized:

$$\text{Range: } R = \frac{cT_{ChirpRamp} \frac{(f_{beat\_P} + f_{beat\_N})}{2}}{2}, \text{ and}$$

$$\text{Velocity: } V = \frac{\lambda \frac{(f_{beat\_P} + f_{beat\_N})}{2}}{2}$$

where $f_{beat\_P}$ and $f_{beat\_N}$ are beat frequencies generated during positive (P) and negative (N) slopes of the chirp 802 respectively and $\lambda$ is the wavelength of the laser signal.

In one example, the scanner 708 of the lidar system 700 is used to scan the environment and generate a target point cloud from the acquired scan data. In some examples, the lidar system 700 can use processing methods that include performing one or more Fourier Transform calculations, such as a Fast Fourier Transform (FFT) or a Discrete Fourier Transform (DFT), to generate the target point cloud from the acquired scan data. Being that the system 700 is capable of measuring range, each point in the point cloud may have a three-dimensional location (e.g., x, y, and z) in addition to radial velocity. In some examples, the x-y location of each target point corresponds to a radial position of the target point relative to the scanner 708. Likewise, the z location of each target point corresponds to the distance between the target point and the scanner 708 (e.g., the range). In one example, each target point corresponds to one frequency chirp 802 in the laser signal. For example, the samples collected by the system 700 during the chirp 802 (e.g., t1 to t6) can be processed to generate one point in the point cloud.

Additional Embodiments, Computing Devices, and Information Handling Systems

Figure 9:
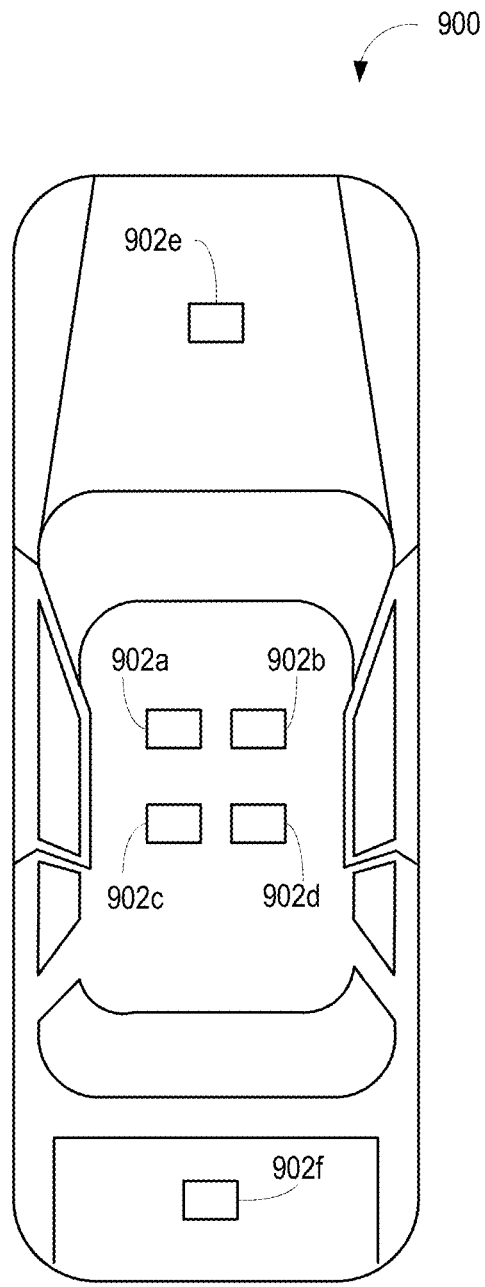
FIG. 9 is a diagram of a vehicle including a plurality of sensors, in accordance with some embodiments.

In some embodiments, lidar systems and techniques described herein may be used to provide mapping and/or autonomous navigation for a vehicle. FIG. 9 illustrates a vehicle 900 having a plurality of sensors 902. As shown, a first sensor 902a, a second sensor 902b, a third sensor 902c, and a fourth sensor 902d may be positioned in a first location on (or inside) the vehicle 900 (e.g., the roof). Likewise, a fifth sensor 902e may be positioned in a second location on (or inside) the vehicle 900 (e.g., the front of the vehicle 900) and a sixth sensor 902f may be positioned in a third location on (or inside) the vehicle 900 (e.g., the back of the vehicle 900). In other examples, a different number or configuration of sensors may be used.

In some examples, at least one sensor of the plurality of sensors 902 is configured to provide (or enable) 3D mapping of the vehicle's surroundings. In certain examples, at least one sensor of the plurality of sensors 902 is used to provide autonomous navigation for the vehicle 900 within an environment. In one example, each sensor 902 includes at least one lidar system, device, or chip. The lidar system(s) included in each sensor 902 may include any of the lidar systems disclosed herein. In some examples, at least one sensor of the plurality of sensors 902 may be a different type of sensor (e.g., camera, radar, etc.). In one example, the vehicle 900 is a car; however, in other examples, the vehicle 900 may be a truck, boat, plane, drone, vacuum cleaner (e.g., robot vacuum cleaner), robot, train, tractor, ATV, or any other type of vehicle or moveable object.

In some embodiments, lidar systems and techniques described herein may be implemented using Silicon photonics (SiP) technologies. SiP is a material platform from which photonic integrated circuits (PICs) can be produced. SiP is compatible with CMOS (electronic) fabrication techniques, which allows PICs to be manufactured using established foundry infrastructure. In PICs, light propagates through a patterned silicon optical medium that lies on top of an insulating material layer (e.g., silicon on insulator (SOI)). In some cases, direct bandgap materials (e.g., indium phosphide (InP)) are used to create light (e.g., laser) sources that are integrated in an SiP chip (or wafer) to drive optical or photonic components within a photonic circuit. SiP technologies are increasingly used in optical datacom, sensing, biomedical, automotive, astronomy, aerospace, augmented reality (AR) applications, virtual reality (VR) applications, artificial intelligence (AI) applications, navigation, image identification, drones, robotics, etc.

Figure 10:
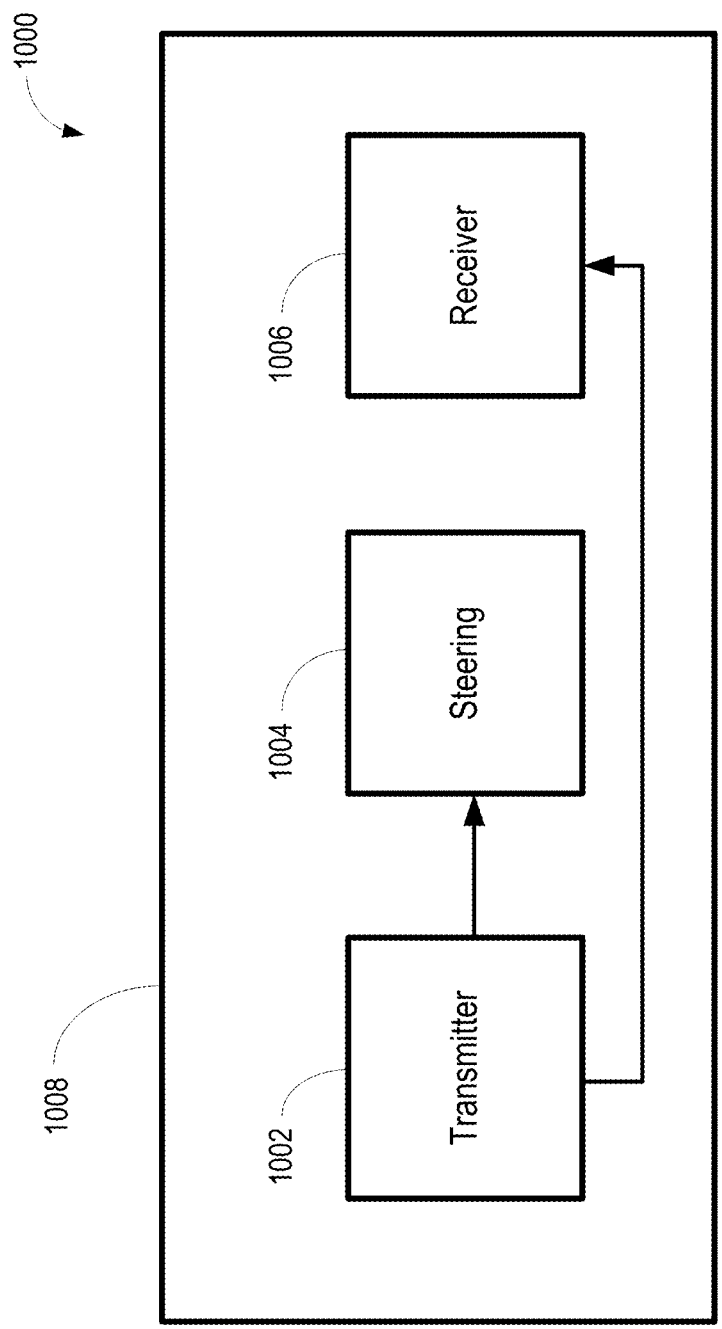
FIG. 10 is a block diagram of a silicon photonic integrated circuit (PIC) in accordance with some embodiments.

FIG. 10 is a block diagram of a silicon photonic integrated circuit (PIC) 1000 in accordance with aspects described herein. In one example, the lidar systems described herein can be implemented as the PIC 1000. The PIC 1000 includes a transmitter module 1002, a steering module 1004, and a receiver module 1006. As shown, the transmitter module 1002, the steering module 1004, and the receiver module 1006 are integrated on a silicon substrate 1008. In other examples, the transmitter module 1002, the steering module 1004, or the receiver module 1006 may be included on a separate substrate. In some embodiments, the steering module 1004 is used by the PIC 1000 in connection with transmission (e.g., emission) and reception (e.g., collection) of optical signals. In some examples, the silicon substrate 1008 is an SOI substrate with a silicon layer (e.g., between 200 nm and 10 micron thick) disposed over an oxide layer (e.g., approximately 2 micron thick). In certain examples, the silicon substrate 1008 can include multiple silicon and/or oxide layers.

In one example, the transmitter module 1002 includes at least one laser source. In some examples, the laser source(s) are implemented using a direct bandgap material (e.g., InP) and integrated on the silicon substrate 1008 via hybrid integration. The transmitter module 1002 may also include at least one splitter, a combiner, and/or a direction selective device that are implemented on the silicon substrate 1008 via monolithic or hybrid integration. In some examples, the laser source(s) are external to the PIC 1000 and the laser signal(s) can be provided to the transmission module 1002.

In some embodiments, lidar systems and techniques described herein may be implemented using micro-electro-mechanical system (MEMS) devices. A MEMS device is a miniature device that has both mechanical and electronic components. The physical dimension of a MEMS device can range from several millimeters to less than one micrometer. Lidar systems may include one or more scanning mirrors implemented as a MEMS mirror (or an array of MEMS mirrors). Each MEMS mirror may be a single-axis MEMS mirror or dual-axis MEMS mirror. The MEMS mirror(s) may be electromagnetic mirrors. A control signal is provided to adjust the position of the mirror to direct light in at least one scan direction (e.g., horizontal and/or vertical). The MEMS mirror(s) can be positioned to steer light transmitted by the lidar system and/or to steer light received by the lidar system. MEMS mirrors are compact and may allow for smaller form-factor lidar systems, faster control speeds, and more precise light steering compared to other mechanical-scanning lidar methods. MEMS mirrors may be used in solid-state (e.g., stationary) lidar systems and rotating lidar systems.

In embodiments, aspects of the techniques described herein (e.g., timing the emission of the transmitted signal, processing received return signals, and so forth) may be directed to or implemented on information handling systems/computing systems. For purposes of this disclosure, a computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a computing system may be a personal computer (e.g., laptop), tablet computer, phablet, personal digital assistant (PDA), smart phone, smart watch, smart package, server (e.g., blade server or rack server), network storage device, or any other suitable device and may vary in size, shape, performance, functionality, and price.

Figure 11:
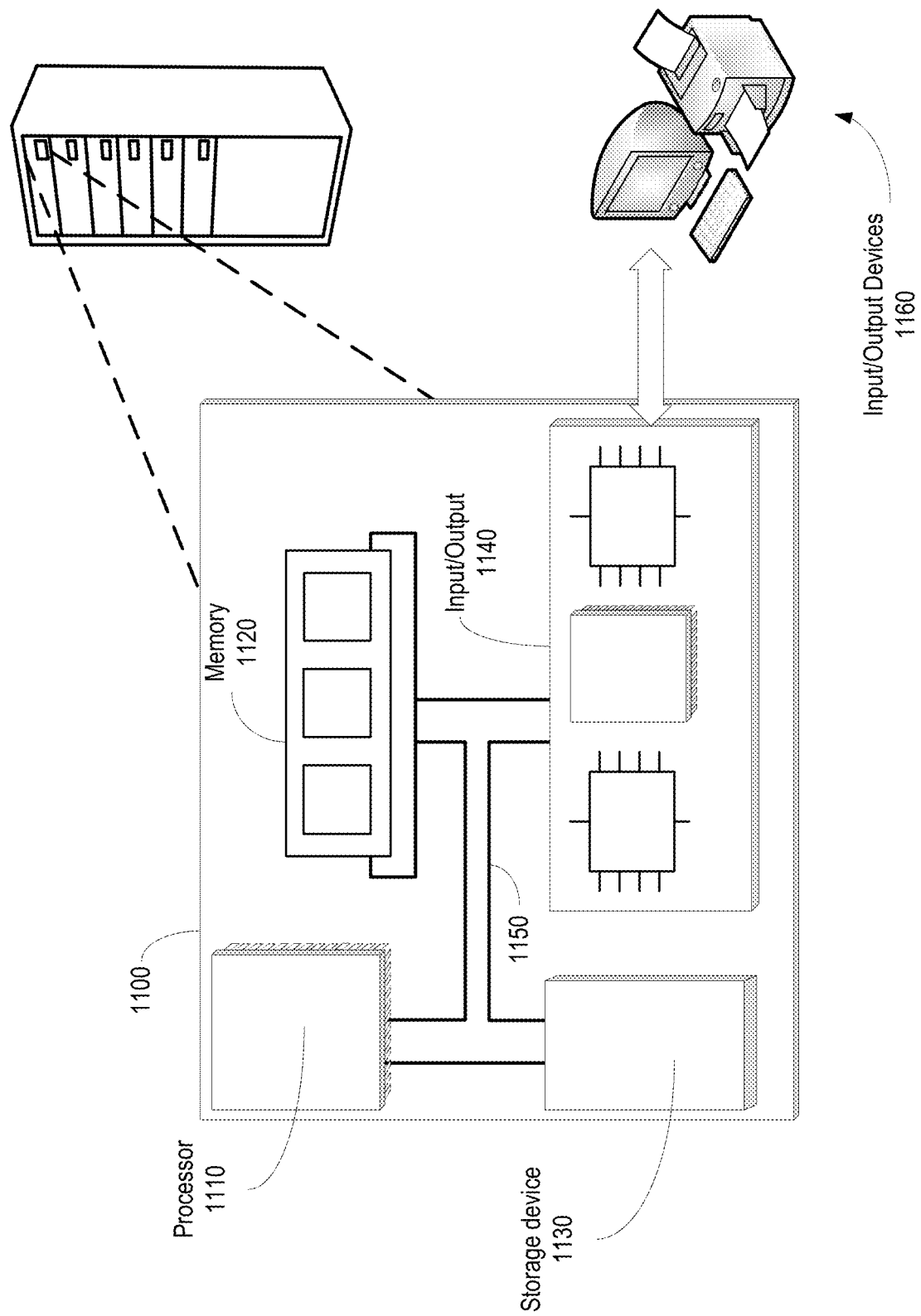
FIG. 11 is a block diagram of an example computer system, in accordance with some embodiments.

FIG. 11 is a block diagram of an example computer system 1100 that may be used in implementing the technology described in this document. General-purpose computers, network appliances, mobile devices, or other electronic systems may also include at least portions of the system 1100. The system 1100 includes a processor 1110, a memory 1120, a storage device 1130, and an input/output device 1140. Each of the components 1110, 1120, 1130, and 1140 may be interconnected, for example, using a system bus 1150. The processor 1110 is capable of processing instructions for execution within the system 1100. In some implementations, the processor 1110 is a single-threaded processor. In some implementations, the processor 1110 is a multi-threaded processor. In some implementations, the processor 1110 is a programmable (or reprogrammable) general purpose microprocessor or microcontroller. The processor 1110 is capable of processing instructions stored in the memory 1120 or on the storage device 1130.

The memory 1120 stores information within the system 1100. In some implementations, the memory 1120 is a non-transitory computer-readable medium. In some implementations, the memory 1120 is a volatile memory unit. In some implementations, the memory 1120 is a non-volatile memory unit.

The storage device 1130 is capable of providing mass storage for the system 1100. In some implementations, the storage device 1130 is a non-transitory computer-readable medium. In various different implementations, the storage device 1130 may include, for example, a hard disk device, an optical disk device, a solid-date drive, a flash drive, or some other large capacity storage device. For example, the storage device may store long-term data (e.g., database data, file system data, etc.). The input/output device 1140 provides input/output operations for the system 1100. In some implementations, the input/output device 1140 may include one or more network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 1160. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 1130 may be implemented in a distributed way over a network, for example as a server farm or a set of widely distributed servers, or may be implemented in a single computing device.

Although an example processing system has been described in FIG. 11, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, a data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array), an ASIC (application specific integrated circuit), or a programmable general purpose microprocessor or microcontroller. A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA, an ASIC, or a programmable general purpose microprocessor or microcontroller.

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship between client and server arises by virtue of computer programs running on the respective computers and having a client-server relationship with each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Figure 12:
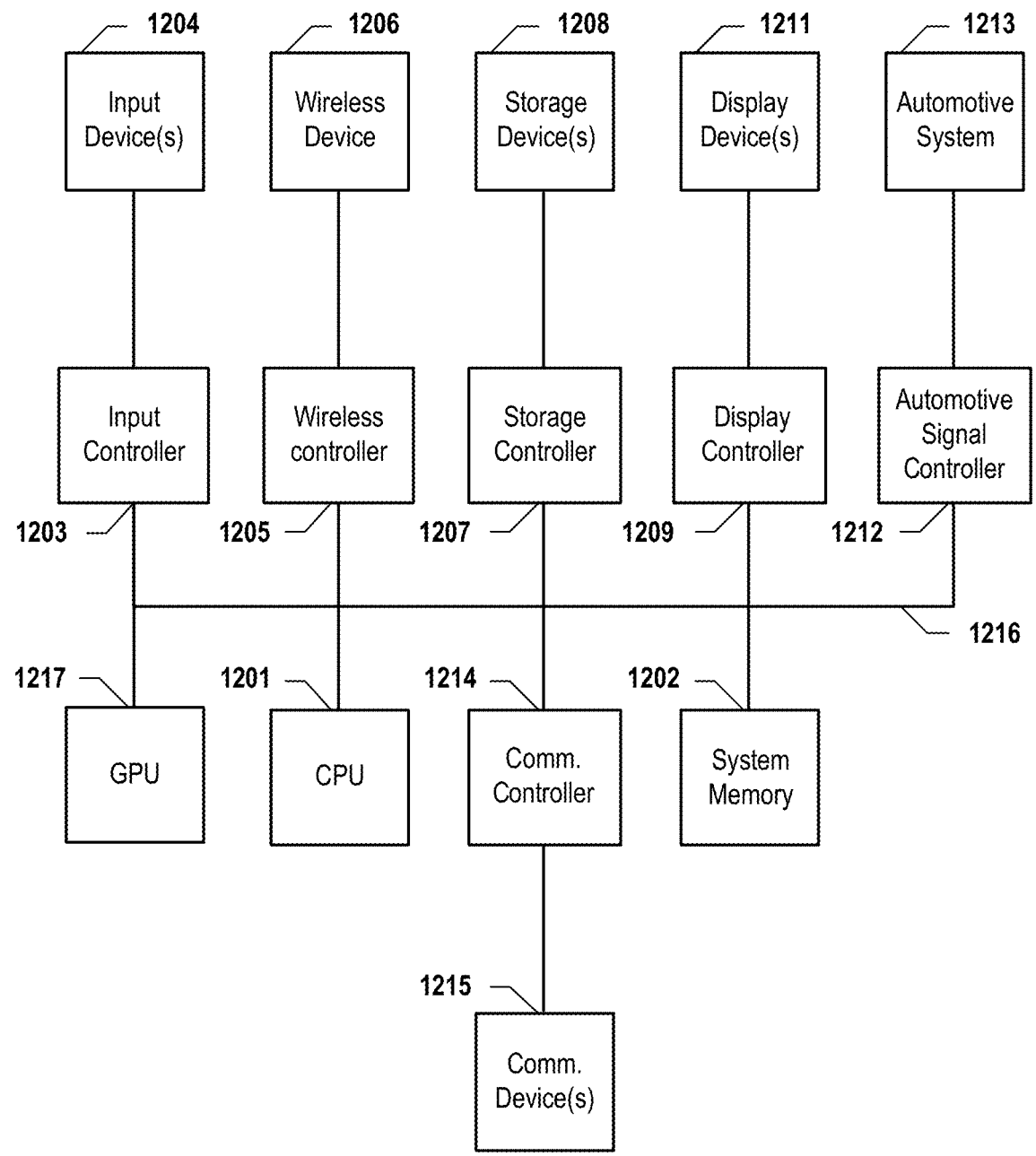
FIG. 12 is a block diagram of a computing device/information handling system, in accordance with some embodiments.

FIG. 12 depicts a simplified block diagram of a computing device/information handling system (or computing system) according to embodiments of the present disclosure. It will be understood that the functionalities shown for system 1200 may operate to support various embodiments of an information handling system—although it shall be understood that an information handling system may be differently configured and include different components.

As illustrated in FIG. 12, system 1200 includes one or more central processing units (CPU) 1101 that provide(s) computing resources and control(s) the computer. CPU 1201 may be implemented with a microprocessor or the like, and may also include one or more graphics processing units (GPU) 1217 and/or a floating point coprocessor for mathematical computations. System 1200 may also include a system memory 1202, which may be in the form of random-access memory (RAM), read-only memory (ROM), or both.

A number of controllers and peripheral devices may also be provided. For example, an input controller 1203 represents an interface to various input device(s) 1204, such as a keyboard, mouse, or stylus. There may also be a wireless controller 1205, which communicates with a wireless device 1206. System 1200 may also include a storage controller 1207 for interfacing with one or more storage devices 1208, each of which includes a storage medium such as a magnetic tape or disk, or an optical medium that might be used to record programs of instructions for operating systems, utilities, and applications, which may include embodiments of programs that implement various aspects of the techniques described herein. Storage device(s) 1208 may also be used to store processed data or data to be processed in accordance with some embodiments. System 1200 may also include a display controller 1209 for providing an interface to a display device 1211, which may be a cathode ray tube (CRT), a thin film transistor (TFT) display, or other type of display. The computing system 1200 may also include an automotive signal controller 1212 for communicating with an automotive system 1213. A communications controller 1214 may interface with one or more communication devices 1215, which enables system 1200 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN), or through any suitable electromagnetic carrier signals including infrared signals.

In the illustrated system, all major system components may connect to a bus 1216, which may represent more than one physical bus. However, various system components may or may not be in physical proximity to one another. For example, input data and/or output data may be remotely transmitted from one physical location to another. In addition, programs that implement various aspects of some embodiments may be accessed from a remote location (e.g., a server) over a network. Such data and/or programs may be conveyed through any of a variety of machine-readable medium including, but not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Some embodiments may be encoded upon one or more non-transitory, computer-readable media with instructions for one or more processors or processing units to cause steps to be performed. It shall be noted that the one or more non-transitory, computer-readable media shall include volatile and non-volatile memory. It shall also be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that some embodiments may further relate to computer products with a non-transitory, tangible computer-readable medium that has computer code thereon for performing various computer-implemented operations. The medium and computer code may be those specially designed and constructed for the purposes of the techniques described herein, or they may be of the kind known or available to those having skill in the relevant arts. Examples of tangible, computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that is executed by a computer using an interpreter. Some embodiments may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the techniques described herein. One skilled in the art will also recognize that a number of the elements described above may be physically and/or functionally separated into sub-modules or combined together.

In embodiments, aspects of the techniques described herein (e.g., timing the emission of optical signals, processing received return signals, generating point clouds, performing one or more (e.g., all) of the steps of the methods described herein, etc.) may be implemented using machine learning and/or artificial intelligence technologies.

"Machine learning" generally refers to the application of certain techniques (e.g., pattern recognition and/or statistical inference techniques) by computer systems to perform specific tasks. Machine learning techniques may be used to build models based on sample data (e.g., "training data") and to validate the models using validation data (e.g., "testing data"). The sample and validation data may be organized as sets of records (e.g., "observations" or "data samples"), with each record indicating values of specified data fields (e.g., "independent variables," "inputs," "features," or "predictors") and corresponding values of other data fields (e.g., "dependent variables," "outputs," or "targets"). Machine learning techniques may be used to train models to infer the values of the outputs based on the values of the inputs. When presented with other data (e.g., "inference data") similar to or related to the sample data, such models may accurately infer the unknown values of the targets of the inference data set.

A feature of a data sample may be a measurable property of an entity (e.g., person, thing, event, activity, etc.) represented by or associated with the data sample. A value of a feature may be a measurement of the corresponding property of an entity or an instance of information regarding an entity. Features can also have data types. For instance, a feature can have an image data type, a numerical data type, a text data type (e.g., a structured text data type or an unstructured ("free") text data type), a categorical data type, or any other suitable data type. In general, a feature's data type is categorical if the set of values that can be assigned to the feature is finite.

As used herein, "model" may refer to any suitable model artifact generated by the process of using a machine learning algorithm to fit a model to a specific training data set. The terms "model," "data analytics model," "machine learning model" and "machine learned model" are used interchangeably herein.

As used herein, the "development" of a machine learning model may refer to construction of the machine learning model. Machine learning models may be constructed by computers using training data sets. Thus, "development" of a machine learning model may include the training of the machine learning model using a training data set. In some cases (generally referred to as "supervised learning"), a training data set used to train a machine learning model can include known outcomes (e.g., labels or target values) for individual data samples in the training data set. For example, when training a supervised computer vision model to detect images of cats, a target value for a data sample in the training data set may indicate whether or not the data sample includes an image of a cat. In other cases (generally referred to as "unsupervised learning"), a training data set does not include known outcomes for individual data samples in the training data set.

Following development, a machine learning model may be used to generate inferences with respect to "inference" data sets. For example, following development, a computer vision model may be configured to distinguish data samples including images of cats from data samples that do not include images of cats. As used herein, the "deployment" of a machine learning model may refer to the use of a developed machine learning model to generate inferences about data other than the training data.

"Artificial intelligence" (AI) generally encompasses any technology that demonstrates intelligence. Applications (e.g., machine-executed software) that demonstrate intelligence may be referred to herein as "artificial intelligence applications," "AI applications," or "intelligent agents." An intelligent agent may demonstrate intelligence, for example, by perceiving its environment, learning, and/or solving problems (e.g., taking actions or making decisions that increase the likelihood of achieving a defined goal). In many cases, intelligent agents are developed by organizations and deployed on network-connected computer systems so users within the organization can access them. Intelligent agents are used to guide decision-making and/or to control systems in a wide variety of fields and industries, e.g., security;

transportation; risk assessment and management; supply chain logistics; and energy management. Intelligent agents may include or use models.

Some non-limiting examples of AI application types may include inference applications, comparison applications, and optimizer applications. Inference applications may include any intelligent agents that generate inferences (e.g., predictions, forecasts, etc.) about the values of one or more output variables based on the values of one or more input variables. In some examples, an inference application may provide a recommendation based on a generated inference. For example, an inference application for a lending organization may infer the likelihood that a loan applicant will default on repayment of a loan for a requested amount, and may recommend whether to approve a loan for the requested amount based on that inference. Comparison applications may include any intelligent agents that compare two or more possible scenarios. Each scenario may correspond to a set of potential values of one or more input variables over a period of time. For each scenario, an intelligent agent may generate one or more inferences (e.g., with respect to the values of one or more output variables) and/or recommendations. For example, a comparison application for a lending organization may display the organization's predicted revenue over a period of time if the organization approves loan applications if and only if the predicted risk of default is less than 20% (scenario #1), less than 10% (scenario #2), or less than 5% (scenario #3). Optimizer applications may include any intelligent agents that infer the optimum values of one or more variables of interest based on the values of one or more input variables. For example, an optimizer application for a lending organization may indicate the maximum loan amount that the organization would approve for a particular customer.

As used herein, "data analytics" may refer to the process of analyzing data (e.g., using machine learning models, artificial intelligence, models, or techniques) to discover information, draw conclusions, and/or support decision-making. Species of data analytics can include descriptive analytics (e.g., processes for describing the information, trends, anomalies, etc. in a data set), diagnostic analytics (e.g., processes for inferring why specific trends, patterns, anomalies, etc. are present in a data set), predictive analytics (e.g., processes for predicting future events or outcomes), and prescriptive analytics (processes for determining or suggesting a course of action).

Data analytics tools are used to guide decision-making and/or to control systems in a wide variety of fields and industries, e.g., security; transportation; risk assessment and management; supply chain logistics; and energy management. The processes used to develop data analytics tools suitable for carrying out specific data analytics tasks generally include steps of data collection, data preparation, feature engineering, model generation, and/or model deployment.

As used herein, "spatial data" may refer to data relating to the location, shape, and/or geometry of one or more spatial objects. Data collected by lidar systems, devices, and chips described herein may be considered spatial data. A "spatial object" may be an entity or thing that occupies space and/or has a location in a physical or virtual environment. In some cases, a spatial object may be represented by an image (e.g., photograph, rendering, etc.) of the object. In some cases, a spatial object may be represented by one or more geometric elements (e.g., points, lines, curves, and/or polygons), which may have locations within an environment (e.g., coordinates within a coordinate space corresponding to the environment). In some cases, a spatial object may be represented as a cluster of points in a 3D point-cloud.

As used herein, "spatial attribute" may refer to an attribute of a spatial object that relates to the object's location, shape, or geometry. Spatial objects or observations may also have "non-spatial attributes." For example, a residential lot is a spatial object that that can have spatial attributes (e.g., location, dimensions, etc.) and non-spatial attributes (e.g., market value, owner of record, tax assessment, etc.). As used herein, "spatial feature" may refer to a feature that is based on (e.g., represents or depends on) a spatial attribute of a spatial object or a spatial relationship between or among spatial objects. As a special case, "location feature" may refer to a spatial feature that is based on a location of a spatial object. As used herein, "spatial observation" may refer to an observation that includes a representation of a spatial object, values of one or more spatial attributes of a spatial object, and/or values of one or more spatial features.

Spatial data may be encoded in vector format, raster format, or any other suitable format. In vector format, each spatial object is represented by one or more geometric elements. In this context, each point has a location (e.g., coordinates), and points also may have one or more other attributes. Each line (or curve) comprises an ordered, connected set of points. Each polygon comprises a connected set of lines that form a closed shape. In raster format, spatial objects are represented by values (e.g., pixel values) assigned to cells (e.g., pixels) arranged in a regular pattern (e.g., a grid or matrix). In this context, each cell represents a spatial region, and the value assigned to the cell applies to the represented spatial region.

"Computer vision" generally refers to the use of computer systems to analyze and interpret image data. In some embodiments, computer vision may be used to analyze and interpret data collected by lidar systems (e.g., point-clouds). Computer vision tools generally use models that incorporate principles of geometry and/or physics. Such models may be trained to solve specific problems within the computer vision domain using machine learning techniques. For example, computer vision models may be trained to perform object recognition (recognizing instances of objects or object classes in images), identification (identifying an individual instance of an object in an image), detection (detecting specific types of objects or events in images), etc.

Computer vision tools (e.g., models, systems, etc.) may perform one or more of the following functions: image pre-processing, feature extraction, and detection/segmentation. Some examples of image pre-processing techniques include, without limitation, image re-sampling, noise reduction, contrast enhancement, and scaling (e.g., generating a scale space representation). Extracted features may be low-level (e.g., raw pixels, pixel intensities, pixel colors, gradients, patterns and textures (e.g., combinations of colors in close proximity), color histograms, motion vectors, edges, lines, corners, ridges, etc.), mid-level (e.g., shapes, surfaces, volumes, patterns, etc.), or high-level (e.g., objects, scenes, events, etc.). The detection/segmentation function may involve selection of a subset of the input image data (e.g., one or more images within a set of images, one or more regions within an image, etc.) for further processing.

Some Embodiments

Some embodiments may include any of the following:
A1. A method of training a machine learning model, the method comprising: obtaining a map of a background scene, the map comprising three-dimensional (3D) point cloud data; obtaining at least one point cloud representation of at least one foreground object, the at least one point cloud representation comprising 3D point cloud data, wherein one or more light detection and ranging (lidar) sensors were used to generate the 3D point cloud data for the map and the at least one point cloud representation; generating a lidar scene by placing the at least one point cloud representation within the map; and training the machine learning model using the generated lidar scene.

A2. The method of clause A1, wherein the background scene comprises at least one of a residential area, a downtown area, a highway, a road, a sidewalk, a city, natural features, natural terrain, or any combination thereof.

A3. The method of clause A1 or A2, wherein obtaining the map comprises retrieving the map from a library comprising a plurality of maps for a plurality of background scenes.

A4. The method of any of clauses A1 to A3, wherein obtaining the map of the background scene comprises: performing one or more scans of the background scene using the one or more lidar sensors; identifying a dynamic object in the one or more scans; and removing the dynamic object from the one or more scans.

A5. The method of any of clauses A1 to A4, wherein the at least one foreground object comprises a car, a bus, a motorcycle, a bicycle, a vehicle, a pedestrian, a person, an animal, or any combination thereof.

A6. The method of any of clauses A1 to A5, wherein obtaining the at least one point cloud representation comprises retrieving the at least one point cloud representation from a library comprising a plurality of point cloud representations for a plurality of foreground objects.

A7. The method of any of clauses A1 to A6, wherein the library comprises point cloud representations of the at least one foreground object in multiple orientations with respect to the one or more lidar sensors.

A8. The method of any of clauses A1 to A7, wherein obtaining the at least one point cloud representation comprises scanning, by the one or more lidar sensors, the at least one foreground object while the at least one foreground object is on a turntable.

A9. The method of any of clauses A1 to A8, wherein the lidar scene comprises at least one annotation identifying the at least one foreground object.

A10. The method of any of clauses A1 to A9, wherein generating the lidar scene comprises selecting a lidar sensor position within the map.

A11. The method of any of clauses A1 to A10, further comprising: generating a second lidar scene by placing the at least one point cloud representation within a second map of a second background scene, the second map comprising 3D point cloud data; and training the machine learning model using the generated second lidar scene.

A12. A system for training a machine learning model, the system comprising: one or more computer processors programmed to perform operations comprising: obtaining a map of a background scene, the map comprising three-dimensional (3D) point cloud data; obtaining at least one point cloud representation of at least one foreground object, the at least one point cloud representation comprising 3D point cloud data, wherein one or more light detection and ranging (lidar) sensors were used to generate the 3D point cloud data for the map and the at least one point cloud representation; generating a lidar scene by placing the at least one point cloud representation within the map; and training the machine learning model using the generated lidar scene.

A13. The system of clause A12, wherein the background scene comprises at least one of a residential area, a downtown area, a highway, a road, a sidewalk, a city, natural features, natural terrain, or any combination thereof.

A14. The system of clause A12 or A13, wherein obtaining the map comprises retrieving the map from a library comprising a plurality of maps for a plurality of background scenes.

A15. The system of any of clauses A12 to A14, wherein obtaining the map of the background scene comprises: performing one or more scans of the background scene using the one or more lidar sensors; identifying a dynamic object in the one or more scans; and removing the dynamic object from the one or more scans.

A16. The system of any of clauses A12 to A15, wherein the at least one foreground object comprises a car, a bus, a motorcycle, a bicycle, a vehicle, a pedestrian, a person, an animal, or any combination thereof.

A17. The system of any of clauses A12 to A16, wherein obtaining the at least one point cloud representation comprises retrieving the at least one point cloud representation from a library comprising a plurality of point cloud representations for a plurality of foreground objects.

A18. The system of any of clauses A12 to A17, wherein the library comprises point cloud representations of the at least one foreground object in multiple orientations with respect to the one or more lidar sensors.

A19. The system of any of clauses A12 to A18, wherein obtaining the at least one point cloud representation comprises scanning, by the one or more lidar sensors, the at least one foreground object while the at least one foreground object is on a turntable.

A20. A method of controlling a vehicle, comprising: collecting data using a light detection and ranging (lidar) sensor on the vehicle while the vehicle is being operated; providing the data to a machine learning model, wherein the machine learning model has been trained using a generated lidar scene, and wherein the generated lidar scene comprises a lidar point cloud representation of at least one foreground object placed within a map of a background scene comprising lidar point cloud data, receiving from the machine learning model an identification of an object in a vicinity of the vehicle; and controlling the vehicle based on the identification of the object in the vicinity of the vehicle.

Terminology

The phrasing and terminology used herein is for the purpose of description and should not be regarded as limiting.

Measurements, sizes, amounts, and the like may be presented herein in a range format. The description in range format is provided merely for convenience and brevity and should not be construed as an inflexible limitation on the scope of the invention. Accordingly, the description of a range should be considered to have specifically disclosed all the possible subranges as well as individual numerical values within that range. For example, description of a range such as 1-20 meters should be considered to have specifically disclosed subranges such as 1 meter, 2 meters, 1-2 meters, less than 2 meters, 10-11 meters, 10-12 meters, 10-13 meters, 10-14 meters, 11-12 meters, 11-13 meters, etc.

Furthermore, connections between components or systems within the figures are not intended to be limited to direct connections. Rather, data or signals between these components may be modified, re-formatted, or otherwise changed by intermediary components. Also, additional or fewer connections may be used. The terms "coupled," "connected," or "communicatively coupled" shall be understood to include direct connections, indirect connections through one or more intermediary devices, wireless connections, and so forth.

Reference in the specification to "one embodiment," "preferred embodiment," "an embodiment," "some embodiments," or "embodiments" means that a particular feature, structure, characteristic, or function described in connection with the embodiment is included in at least one embodiment of the invention and may be in more than one embodiment. Also, the appearance of the above-noted phrases in various places in the specification is not necessarily referring to the same embodiment or embodiments.

The use of certain terms in various places in the specification is for illustration purposes only and should not be construed as limiting. A service, function, or resource is not limited to a single service, function, or resource; usage of these terms may refer to a grouping of related services, functions, or resources, which may be distributed or aggregated.

Furthermore, one skilled in the art shall recognize that: (1) certain steps may optionally be performed; (2) steps may not be limited to the specific order set forth herein; (3) certain steps may be performed in different orders; and (4) certain steps may be performed simultaneously or concurrently.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements).

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements).

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

It will be appreciated by those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of training a machine learning model, the method comprising:
   obtaining a map of a background scene, the map comprising three-dimensional (3D) point cloud data;
   obtaining, by retrieving from a library of point cloud images of a plurality of foreground objects, at least one point cloud representation of at least one foreground object, the at least one point cloud representation comprising 3D point cloud data,
      wherein one or more light detection and ranging (lidar) sensors were used to generate the 3D point cloud data for the map and the at least one point cloud representation and
      wherein the library comprises point cloud representations of the at least one foreground object in multiple orientations with respect to the one or more lidar sensors;
   generating a lidar scene by placing the at least one point cloud representation within the map; and
   training the machine learning model using the generated lidar scene.

2. The method of claim 1, wherein the background scene comprises at least one of a residential area, a downtown area, a highway, a road, a sidewalk, a city, natural features, natural terrain, or any combination thereof.

3. The method of claim 1, wherein obtaining the map comprises retrieving the map from a library comprising a plurality of maps for a plurality of background scenes.

4. The method of claim 1, wherein obtaining the map of the background scene comprises:
   performing one or more scans of the background scene using the one or more lidar sensors;
   identifying a dynamic object in the one or more scans; and
   removing the dynamic object from the one or more scans.

5. The method of claim 1, wherein the at least one foreground object comprises a car, a bus, a motorcycle, a bicycle, a vehicle, a pedestrian, a person, an animal, or any combination thereof.

6. The method of claim 1, further comprising:
   scanning, by the one or more lidar sensors, the at least one foreground object while the at least one foreground object is on a turntable, thereby obtaining the point cloud representations of the at least one foreground object in multiple orientations with respect to the one or more lidar sensors; and
   storing the point cloud representations of the at least one foreground object in the library of point cloud images.

7. The method of claim 1, wherein the lidar scene comprises at least one annotation identifying the at least one foreground object.

8. The method of claim 1, wherein generating the lidar scene comprises selecting a lidar sensor position within the map.

9. The method of claim 1, further comprising:
   generating a second lidar scene by placing the at least one point cloud representation within a second map of a second background scene, the second map comprising 3D point cloud data; and
   training the machine learning model using the generated second lidar scene.

10. A system for training a machine learning model, the system comprising:
    one or more computer processors programmed to perform operations comprising:
       obtaining a map of a background scene, the map comprising three-dimensional (3D) point cloud data;
       obtaining, by retrieving from a library of point cloud images of a plurality of foreground objects, at least one point cloud representation of at least one foreground object, the at least one point cloud representation comprising 3D point cloud data,
          wherein one or more light detection and ranging (lidar) sensors were used to generate the 3D point cloud data for the map and the at least one point cloud representation and
          wherein the library comprises point cloud representations of the at least one foreground object in multiple orientations with respect to the one or more lidar sensors;
       generating a lidar scene by placing the at least one point cloud representation within the map; and
       training the machine learning model using the generated lidar scene.

11. The system of claim 10, wherein the background scene comprises at least one of a residential area, a downtown area, a highway, a road, a sidewalk, a city, natural features, natural terrain, or any combination thereof.

12. The system of claim 10, wherein obtaining the map comprises retrieving the map from a library comprising a plurality of maps for a plurality of background scenes.

13. The system of claim 10, wherein obtaining the map of the background scene comprises:
    performing one or more scans of the background scene using the one or more lidar sensors;
    identifying a dynamic object in the one or more scans; and
    removing the dynamic object from the one or more scans.

14. The system of claim 10, wherein the at least one foreground object comprises a car, a bus, a motorcycle, a bicycle, a vehicle, a pedestrian, a person, an animal, or any combination thereof.

15. The system of claim 10, wherein the one or more computer processors include at least one processor programmed to perform operations comprising:
    scanning, by the one or more lidar sensors, the at least one foreground object while the at least one foreground object is on a turntable, thereby obtaining the point cloud representations of the at least one foreground object in multiple orientations with respect to the one or more lidar sensors; and
    storing the point cloud representations of the at least one foreground object in the library of point cloud images.

16. A method of controlling a vehicle, comprising:
    collecting data using a light detection and ranging (lidar) sensor on the vehicle while the vehicle is being operated;
    providing the data to a machine learning model,
       wherein the machine learning model has been trained using a generated lidar scene, and
       wherein the generated lidar scene comprises a lidar point cloud representation of at least one foreground object placed within a map of a background scene comprising lidar point cloud data,
       wherein the lidar point cloud representation of the at least one foreground object is obtained from a library of point cloud images of a plurality of foreground objects, the library comprising point cloud representations of the at least one foreground object in multiple orientations with respect to the one or more lidar sensors,
    receiving from the machine learning model an identification of an object in a vicinity of the vehicle; and controlling the vehicle based on the identification of the object in the vicinity of the vehicle.

* * * * *